(12) United States Patent
Mizuochi et al.

(10) Patent No.: US 7,535,418 B2
(45) Date of Patent: May 19, 2009

(54) TERMINAL APPARATUS, POSITIONING METHOD, CONTROL PROGRAM FOR TERMINAL APPARATUS, AND COMPUTER READABLE RECORDING MEDIUM HAVING RECORDED THEREIN CONTROL PROGRAM FOR TERMINAL APPARATUS

(75) Inventors: Shunichi Mizuochi, Matsumoto (JP); Akifumi Hayashi, Misato-mura (JP)

(73) Assignee: Seiko Epson Corporation, Tokyo (JP)

( * ) Notice: Subject to any disclaimer, the term of this patent is extended or adjusted under 35 U.S.C. 154(b) by 224 days.

(21) Appl. No.: 11/126,394

(22) Filed: May 11, 2005

(65) Prior Publication Data

US 2005/0253754 A1  Nov. 17, 2005

(30) Foreign Application Priority Data

May 14, 2004 (JP) ............................. 2004-144875

(51) Int. Cl.
*G01S 1/00* (2006.01)
*G01S 5/14* (2006.01)
(52) U.S. Cl. ............................. 342/357.15; 342/357.03
(58) Field of Classification Search ............ 342/357.15, 342/357.06, 357.01, 357.03; 455/403–466, 455/12.1, 17; 701/213
See application file for complete search history.

(56) References Cited

U.S. PATENT DOCUMENTS

| 4,445,118 | A | * | 4/1984 | Taylor et al. ............ 342/357.09 |
| 4,797,677 | A | * | 1/1989 | MacDoran et al. .......... 342/352 |
| 5,119,101 | A | * | 6/1992 | Barnard ................. 342/357.05 |
| 5,177,490 | A | * | 1/1993 | Ando et al. ............ 342/357.15 |
| 5,625,556 | A | * | 4/1997 | Janky et al. ................... 701/1 |
| 6,133,874 | A | * | 10/2000 | Krasner ................. 342/357.15 |
| 6,208,292 | B1 | * | 3/2001 | Sih et al. ............... 342/357.12 |
| 6,236,354 | B1 | * | 5/2001 | Krasner ................. 342/357.06 |
| 6,252,545 | B1 | * | 6/2001 | Da et al. .................. 342/357.1 |
| 6,300,899 | B1 | * | 10/2001 | King ..................... 342/357.12 |
| 6,392,593 | B1 | * | 5/2002 | Pemble .................. 342/357.15 |
| 6,424,826 | B1 | * | 7/2002 | Horton et al. ............... 455/255 |
| 6,476,762 | B2 | * | 11/2002 | Valio et al. ............. 342/357.02 |
| 6,510,387 | B2 | * | 1/2003 | Fuchs et al. .................. 701/213 |

(Continued)

FOREIGN PATENT DOCUMENTS

JP       05-058001 A1    3/1993

(Continued)

*Primary Examiner*—Thomas H Tarcza
*Assistant Examiner*—Harry Liu
(74) *Attorney, Agent, or Firm*—Global IP Counselors, LLP

(57) ABSTRACT

A terminal apparatus includes a control unit and a positioning device. The control unit determines a first satellite-to-be-acquired from among a plurality of SPS satellites, and generates an initial search frequency for the first satellite-to-be-acquired. The positioning device has a plurality of search units, and is configured to acquire the first satellite-to-be-acquired using the plurality of search units. The control unit determines first difference information, which is a difference between the initial search frequency and the frequency at which the first satellite-to-be-acquired is acquired. The control unit generates corrected search frequencies for other SPS satellites, using the first difference information. The positioning device acquires other necessary SPS satellites using the corresponding corrected search frequencies. The terminal apparatus can acquire SPS satellites accurately even when there has been a frequency shift in the terminal apparatus since the last positioning.

19 Claims, 15 Drawing Sheets

U.S. PATENT DOCUMENTS

| | | | | |
|---|---|---|---|---|
| 6,570,533 | B2 * | 5/2003 | Syrjarinne et al. | 342/357.12 |
| 6,670,916 | B2 * | 12/2003 | Edwards et al. | 342/357.15 |
| 6,697,016 | B1 * | 2/2004 | Voor et al. | 342/357.15 |
| 6,701,153 | B1 * | 3/2004 | Chang et al. | 455/456.1 |
| 6,714,160 | B2 * | 3/2004 | McBurney | 342/357.15 |
| 6,765,953 | B1 * | 7/2004 | Harms et al. | 375/150 |
| 6,937,872 | B2 * | 8/2005 | Krasner | 455/502 |
| 6,952,440 | B1 * | 10/2005 | Underbrink | 375/150 |
| 6,965,754 | B2 * | 11/2005 | King | 455/12.1 |
| 6,973,328 | B1 * | 12/2005 | Suematsu | 455/552.1 |
| 7,046,194 | B2 * | 5/2006 | Dooley et al. | 342/357.15 |
| 7,062,240 | B2 * | 6/2006 | Ballantyne et al. | 455/182.1 |
| 7,095,368 | B1 * | 8/2006 | van Diggelen | 342/357.01 |
| 2001/0005680 | A1 * | 6/2001 | Sih et al. | 455/456 |
| 2002/0167441 | A1 * | 11/2002 | McBurney et al. | 342/357.03 |
| 2003/0128158 | A1 * | 7/2003 | Jandrell | 342/357.12 |
| 2003/0156058 | A1 * | 8/2003 | Edwards et al. | 342/357.04 |
| 2003/0187576 | A1 * | 10/2003 | Sanmiya et al. | 701/213 |
| 2004/0041729 | A1 * | 3/2004 | Rowitch | 342/357.15 |
| 2004/0142701 | A1 * | 7/2004 | Abraham | 455/456.1 |
| 2004/0192334 | A1 * | 9/2004 | McBurney et al. | 455/456.1 |
| 2005/0079846 | A1 * | 4/2005 | Sendonaris et al. | 455/255 |
| 2006/0038719 | A1 * | 2/2006 | Pande et al. | 342/357.12 |
| 2006/0055595 | A1 * | 3/2006 | Bustamante et al. | 342/357.02 |

FOREIGN PATENT DOCUMENTS

| | | |
|---|---|---|
| JP | 05-157826 | 6/1993 |
| JP | 05-256926 A | 10/1993 |
| JP | H05-281330 A | 10/1993 |
| JP | 06-235762 | 8/1994 |
| JP | 07-191127 | 7/1995 |
| JP | 2002-522793 | 7/2002 |
| JP | 2004-504612 | 2/2004 |
| JP | 2005-214916 | 8/2005 |
| JP | 2005-326281 A | 11/2005 |
| WO | WO-98/25158 A1 | 6/1998 |

* cited by examiner

TERMINAL APPARATUS, POSITIONING METHOD, CONTROL PROGRAM FOR TERMINAL APPARATUS, AND COMPUTER READABLE RECORDING MEDIUM HAVING RECORDED THEREIN CONTROL PROGRAM FOR TERMINAL APPARATUS

BACKGROUND OF THE INVENTION

1. Field of the Invention

The present invention relates to a terminal apparatus, a positioning method, a control program for the terminal apparatus, and a computer readable recording medium having recorded therein the control program for the terminal apparatus.

2. Background Information

Conventionally, a positioning system that locates a present position of a SPS receiver using, for example, a SPS (Satellite Positioning System), which is a satellite navigation system using positioning satellites, has been used. This SPS receiver is constituted to detect a signal frequency (a reception signal frequency) from a signal received from a SPS satellite based on orbit information of the SPS satellite stored in advance. The SPS receiver then synchronizes itself with the reception signal frequency by a synchronizer provided in the SPS receiver to thereby receive the signal from the SPS satellite.

However, the frequency of a crystal oscillator, which is an example of the synchronizer of the SPS receiver, fluctuates depending on the temperature. Thus, the SPS receiver cannot be synchronized with the reception signal frequency in a consistent manner, it takes a longer time to position the SPS receiver.

To cope with this problem, there has been proposed a technique in which information indicating a fluctuation in the frequency of the SPS receiver that was observed last time the positioning was performed, and when a signal is to be received from the SPS satellite next time, the SPS receiver synchronizes itself with the reception signal frequency taking into account the fluctuation of the frequency of the last time. Japanese Patent Application Publication 5-256926 (FIG. 1, etc.) discloses an example of such construction.

However, in such conventional arrangement, there is a problem that, for example, when the temperature changes since the last time the positioning was performed, the amount of fluctuation of the frequency also changes significantly. Accordingly, the synchronization cannot be performed promptly, and long time is required for positioning of the SPS satellite.

In view of the above, it will be apparent to those skilled in the art from this disclosure that there exists a need for an improved terminal apparatus, a positioning method, a control program for the terminal apparatus, and a computer readable recording medium having recorded therein the control program for the terminal apparatus that overcome the problems of the conventional art. This invention addresses this need in the art as well as other needs, which will become apparent to those skilled in the art from this disclosure.

SUMMARY OF THE INVENTION

Thus, it is an object of the invention to provide a terminal apparatus, a positioning method, a control program for the terminal apparatus, and a computer readable recording medium having recorded therein the control program for the terminal apparatus that can acquire a position information satellite promptly to perform positioning even when shift of a frequency at the time when positioning was performed last time and present shift of a frequency are different significantly.

According to a first aspect of the present invention, a terminal apparatus is configured to receive position related information signals from a plurality of SPS. The terminal apparatus includes a control unit and a positioning device. The control unit is configured to determine a first satellite-to-be-acquired from among the plurality of SPS, and to generate a first initial search frequency for the first satellite-to-be-acquired. The positioning device has a plurality of search units, and is configured to acquire the first satellite-to-be-acquired using the plurality of search units. The control unit is further configured to determine first difference information, which is a difference between the first initial search frequency and the frequency at which the first satellite-to-be-acquired is acquired. The control unit is further configured to generate, using the first difference information, corrected search frequencies for at least some of the plurality of SPS excluding the first satellite-to-be-acquired. The positioning device is further configured to acquire at least another position information satellite using the corresponding corrected search frequency.

Here, the first satellite-to-be-acquired is acquired using all the usable search units. For example, one of the SPS is acquired by the twenty search units. Therefore, it is possible to acquire the first position information satellite in shorter time than acquiring the first position information satellite using only some of the search units, for example, five search units.

When the first satellite-to-be-acquired is acquired, the first acquisition frequency, which is the frequency of the positioning device at which the first satellite-to-be-acquired is acquired.

The first difference information indicates shift between the terminal side initial search frequency corresponding to the first satellite-to-be-acquired and the first acquisition frequency (hereinafter referred to as shift of a synchronizing frequency). Since orbits of the respective SPS are not identical, the terminal side synchronizing frequency is different for each of the SPS. However, since the shift of a synchronizing frequency is caused by a factor on the terminal apparatus side, the shift of a synchronizing frequency is common to all the SPS. Therefore, it is possible to correct the shift of a synchronizing frequency for each of the SPS using the first difference information and acquire the second and subsequent SPS promptly to perform positioning.

Consequently, it is possible to provide a terminal apparatus that can acquire a position information satellite promptly and perform positioning even when the shift of a synchronizing frequency has changed since the last positioning and the present shift of a synchronizing frequency is different significantly.

A second aspect of the present invention is the terminal apparatus according to the terminal apparatus of the first aspect, wherein the control unit is further configured to determine a second satellite-to-be-acquired from among the plurality of SPS excluding the first satellite-to-be-acquired. The control unit is configured to generate a second initial search frequency for the second satellite-to-be-acquired. The positioning device is configured to acquire the second satellite-to-be-acquired using some of the plurality of search units. The control unit is further configured to determine second difference information, which is a difference between the second initial search frequency of the second satellite-to-be-acquire and the frequency at which the second satellite-to-be-acquired is acquired.

Here, the SPS are acquired with not only the first difference information but also the second difference information. Thus, it is impossible to verify whether the shift of a synchronizing frequency is accurate.

In this regard, according to the constitution of the invention, since the second difference information is also used, it is possible to acquire the SPS of a number required for positioning after verifying whether the shift of a synchronizing frequency indicated by the first difference information is accurate. In addition, when accuracy of the first difference information is verified, accuracy of the second difference information is also verified simultaneously.

Consequently, it is possible to acquire a position information satellite promptly and perform positioning on the basis of the first difference information or the second difference information, after verifying the accuracy of the difference information.

A third aspect of the present invention is the terminal apparatus according to the terminal apparatus of the second aspect, wherein the control unit is configured to verify the first difference information by comparing the first and second difference information. When the first and second difference information is substantially equal, the control unit is further configured to generate, using one of the first and second difference information, corrected search frequencies for at least some of the plurality of SPS excluding the first and second satellites-to-be-acquired. The positioning device is further configured to acquire at least another position information satellite using the corresponding corrected search frequency.

According to the fourth aspect of the present invention is the terminal apparatus according to the terminal apparatus of the second aspect, wherein the positioning device is configured to set aside some of the search units for tracking the first satellite-to-be-acquired that has been acquired, and the positioning device is configured to acquire the second satellite-to-be-acquired using all of the remaining search units.

It is desirable to track the acquired first satellite-to-be-acquired in order to obtain information for positioning. For that purpose, the search units are set aside for tracking.

In the mean time, it is possible to complete acquisition of the second acquisition object satellite in short time by acquiring the second acquisition object satellite using as many search units as possible.

In this regard, according to the constitution of the fourth aspect of the present invention, the second satellite-to-be-acquired is acquired using all of the remaining search units excluding the search units reserved for tracking. Thus, it is possible to acquire the second satellite-to-be-acquired promptly to obtain the second difference information while making it possible to obtain information for positioning from the first satellite-to-be-acquired.

A fifth aspect of the present invention is the terminal apparatus according to the terminal apparatus of the second aspect, wherein the positioning device is configured to set aside some of the remaining search units for tracking the second satellite-to-be-acquired that has been acquired. The control unit is configured to determine how many SPS need to be acquired. The positioning device is configured to acquire all other SPS that need to be acquired using all of the remaining search units and allocating the remaining search units substantially equally among the SPS that need to be acquired.

It is desirable to track both the first satellite-to-be-acquired and the second acquisition object satellite in order to acquire information for positioning not only from the first satellite-to-be-acquired but also from the second satellite-to-be-acquired. For that purpose, the search units are set aside for tracking the two position information satellite.

With the first satellite-to-be-acquired and the second acquisition object satellite being tracked, the number of additional SPS that need to be acquired is one in the case of the two-dimensional positioning and two in the case of the three-dimensional positioning. Thus, the amount of time required to acquire the three or four SPS can be reduced.

Furthermore, since the accuracy of the shift of a synchronizing frequency is verified by the first difference information and the second difference information, it is possible to acquire the third and subsequent SPS promptly even if there are fewer searching means.

Consequently, by acquiring the third and subsequent SPS using the equally allocated remaining search units simultaneously, it is possible to complete the acquisition of the third and subsequent SPS more promptly than acquiring the SPS one by one.

A sixth aspect of the present invention is the terminal apparatus according to the terminal apparatus of the second aspect, wherein the positioning device is configured to set aside some of the remaining search units for tracking the first satellite-to-be-acquired that has been acquired, and when the tracking of the first satellite-to-be-acquired fails, the control unit is further configured to determine a new first satellite-to-be-acquired.

Nowadays, there are an abundance of radio waves (electromagnetic waves) as a result of the development of various radio systems. Therefore, the terminal apparatus may erroneously recognize that a signal from the position information satellite is received when in fact it is a signal from a source other than the position information satellite (hereinafter referred to as a wrong signal) that is received. In the case of the wrong signal, since the first difference information is inaccurate, the first difference information cannot be used for acquisition of other SPS.

In the case of this wrong signal, since the wrong signal does not carry a position related signal that is carried by a signal from a true position information satellite, the terminal apparatus cannot track the position information satellite after the acquisition. Therefore, the terminal apparatus can recognize the wrong signal.

According to the constitution of the sixth aspect of the present invention, in the case of the wrong signal, the terminal apparatus can determine the first satellite-to-be-acquired again and obtain the first difference information from the true position information satellite.

According to a seventh aspect of the present invention, in the terminal apparatus according to the first aspect, the positioning device is configured to set aside some of the remaining search units for tracking the first satellite-to-be-acquired that has been acquired, the control unit is configured to determine how many SPS need to be acquired, and the positioning device is configured to acquire all other SPS that need to be acquired using all of the remaining search units and allocating the remaining search units substantially equally among the SPS that need to be acquired.

Here, the number of SPS required for positioning is, for example, four in the case of three-dimensional positioning and three in the case of two-dimensional positioning. In other words, in a satellite positioning system, it is necessary to receive signals from, for example, four SPS in order to measure a present position in the three-dimensional positioning.

With the present invention, the requisite number of SPS (e.g., three other than the first satellite-to-be-acquired) are acquired using the first difference information, which indicates a difference between the first acquisition frequency and the terminal side initial search frequency of the first satellite-to-be-acquired.

On the other hand, if all the search units, for example twenty search units, are equally allocated to each of the SPS to be acquired, in other words five search units for each of the position information satellite to acquire the four SPS, it takes long time to acquire all of the SPS, particularly if the shift of the frequency of the positioning device has changed since the last positioning.

With the seventh aspect of the present invention, it is possible to provide a terminal apparatus that can acquire a position information satellite promptly and perform positioning even when the shift of a synchronizing frequency has changed since the last positioning and the present shift of a synchronizing frequency is different significantly.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

(FIG. 8)

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Preferred embodiments of the invention will be hereinafter explained in detail with reference to the attached drawings and the like.

Figure 1:
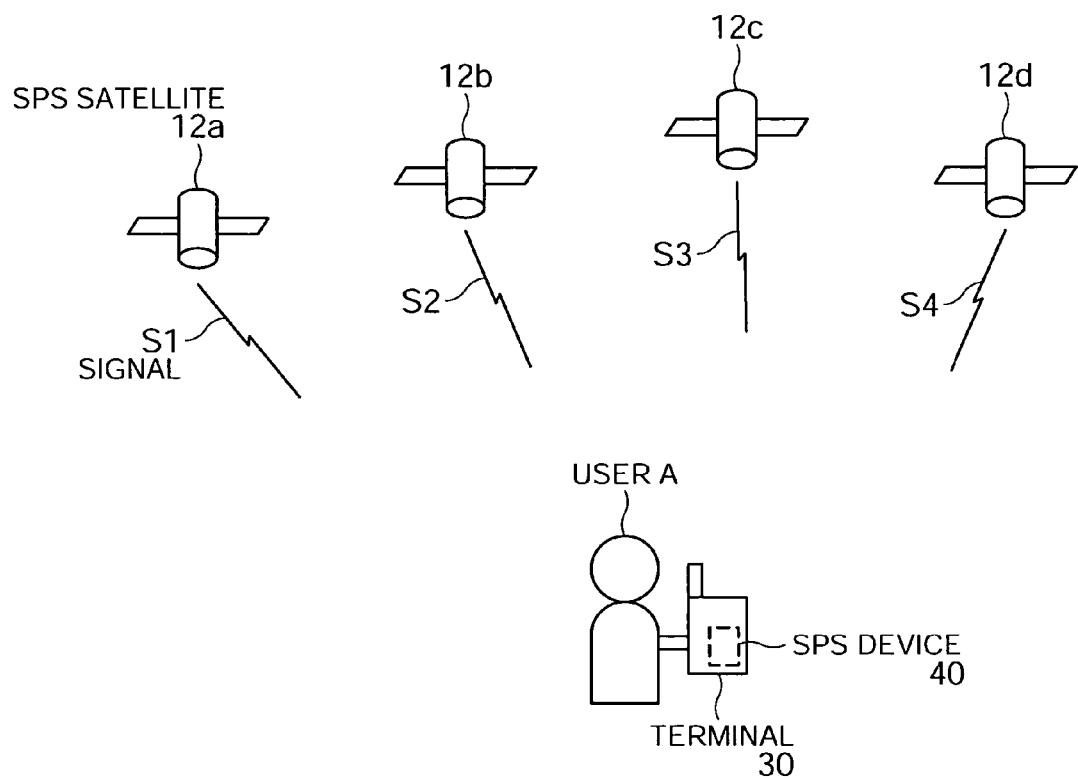
FIG. 1 is a schematic diagram of a satellite positioning system that utilizes a terminal apparatus in accordance with a first embodiment of the invention.

FIG. 1 is a schematic diagram showing a terminal 30 in accordance with an embodiment of the present invention.

As shown in FIG. 1, the terminal 30 has, for example, a SPS device 40, which is an example of the positioning means, obtains position related information from, for example, SPS satellites 12a, 12b, 12c, and 12d, which are an example of a plurality of SPS, and thereby locates the present position.

The SPS device 40 receives a position related signal SI from the SPS satellite 12a, a position related signal S2 from the SPS satellite 12b, a position related signal S3 from the SPS satellite 12c, and a position related signal S4 from the SPS satellite 12d.

The terminal 30 is, in this embodiment, a cellular phone. However, the terminal may be a PHS (Personal Handy-phone System), a PDA (Personal Digital Assistance), or other devices.

Main Hardware Configuration of the Terminal 30

Figure 2:
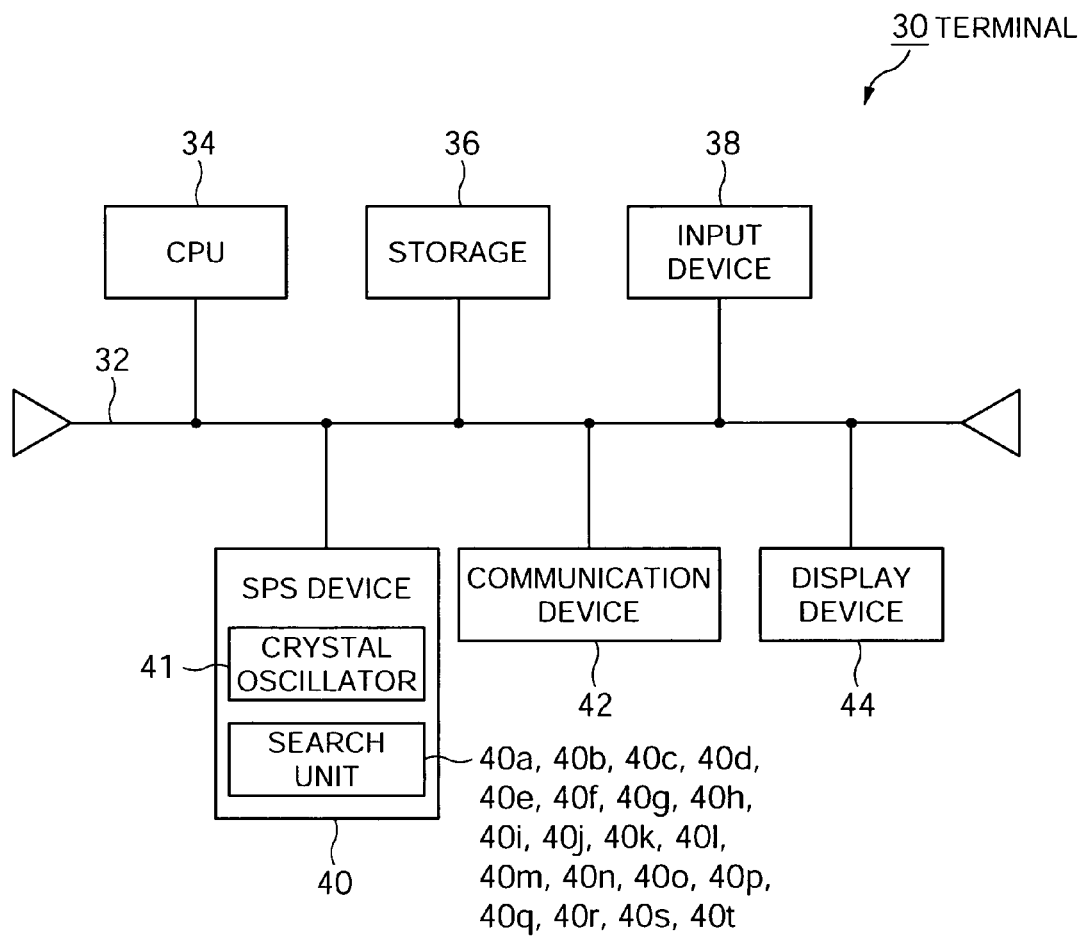
FIG. 2 is a schematic diagram of a main hardware configuration of the terminal apparatus in accordance with the first embodiment of the invention.

FIG. 2 is a schematic diagram showing a main hardware configuration of the terminal 30.

As shown in FIG. 2, the terminal 30 has, for example, a computer. Such computer has a bus 32, a CPU (Central Processing Unit) 34, a storage 36, and an input device 38 that are connected to the bus 32, and other conventional components. The CPU 34 is a control unit that performs processing of a predetermined program and controls the storage 36 and other components connected to the bus 32. The storage 36 is, for example, a RAM (Random Access Memory) and/or a ROM (Read Only Memory).

The terminal 30 further includes a communication device 42, a display device 44, and a SPS device 40, which are all connected to the bus 32. The communication device 42 performs communication via a base station and a communication network. The base station and the communication network are not shown in the figures. The display device 44 displays various kinds of information.

As shown in FIG. 2, the SPS device 40 has a crystal oscillator 41 and search units 40a-40t. The crystal oscillator 41 servers as an oscillator, and oscillates at a frequency from which a signal of a synchronizing frequency is created for locating the SPS satellites 12a-12d shown in FIG. 1. The search units 40a to 40t serve as the searching means for searching for the SPS satellites 12a-12d. The search units 40a-40t allow the frequency generated by the oscillation of the crystal oscillator 41 to be modulated such that a signal having a synchronizing frequency which will be described later is generated and some of the SPS satellites 12a-12d can be captured using the synchronizing frequency. In other words, the search units 40a-40t allow the frequency at which the SPS device 40 synchronizes with the signals S1-S4 from the SPS satellites 12a-12d to be modulated, such that the SPS satellites 12a-12d can be acquired by synchronizing with the signals S1-S4 from the SPS satellites 12a-12d. Furthermore, the search units 40a to 40t are also used for tracking the SPS satellites 12a-12d once the SPS satellites 12a-12d are acquired.

In this embodiment, a search for a frequency and a search for the SPS satellites 12a-12d are equivalent to one another. Therefore, these terms are used synonymously.

Each of the search units 40a-40t uses one frequency at a time. Therefore, for example, the SPS device 40 having twenty search units 40a-40t in total can use twenty frequencies simultaneously. In other words, the SPS device 40 can conduct search with twenty SPS satellites simultaneously. In this embodiment, it is assumed that the number of SPS satellites that communicate with the SPS device 40 is four for the sake of simplicity. However, the present invention is not limited to SPS system having four SPS satellites. The SPS system may have any number of SPS satellites.

Here, the number of frequencies, which can be searched at a time, is referred to as search power. Since the SPS device 40 can search for twenty frequencies at a time, the search power is 20.

Search Method

A method of search by the SPS device 40 will now be explained.

Figure 3:
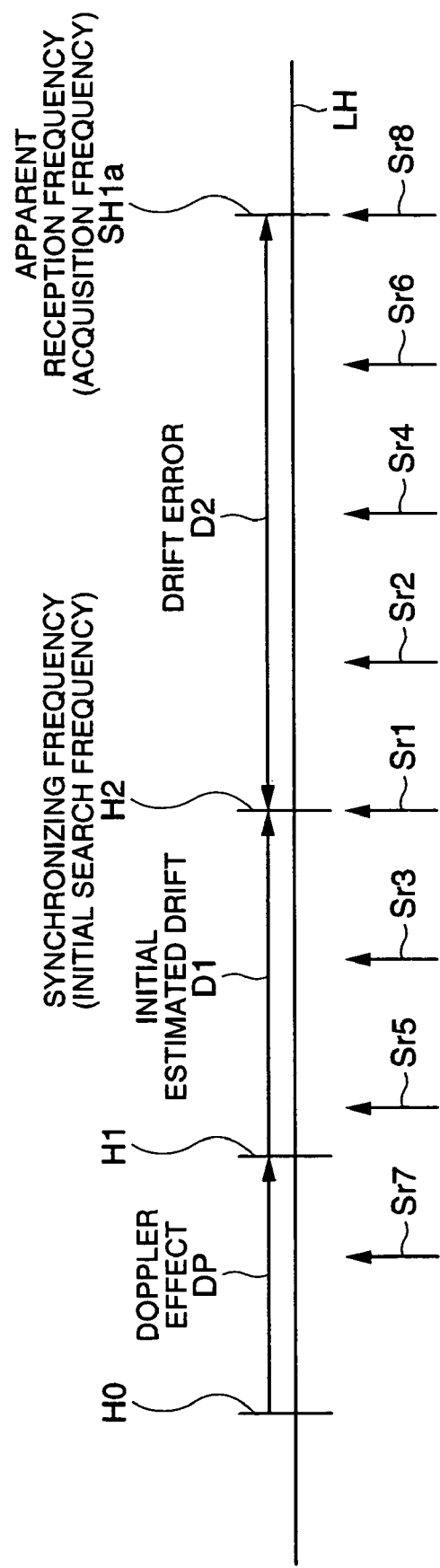
FIG. 3 is a conceptual diagram showing a search method for a SPS satellite.

FIG. 3 is a conceptual diagram showing a search method for the SPS satellites 12a-12d.

In order to obtain signals from the SPS satellites 12a-12t, a synchronizing frequency on the SPS device 40 side has to be adjusted to frequencies of the respective satellites. However, the frequencies of signal S1-S4 as transmitted from the SPS satellites 12a-12t may be different from the frequencies of the signals S1-S4 as received by the SPS device 40 as explained below because of the Doppler effect caused by relative change in positions of the satellites 12a-12t and the SPS device 40 and also because fluctuation in the frequency of the crystal oscillator 41 which generates the synchronizing frequency on the SPS device 40 side.

For example, a point H0 (see FIG. 3) on a straight line LH which shows a frequency range indicates a frequency of the signal S1 when it is transmitted from the SPS satellite 12a in FIG. 1. The frequency of the signal S1 changes to H1 due to the Doppler effect DP when the signal S1 is received by the SPS device 40.

However, the SPS device 40 does not always recognize the signal S1 as a signal of the frequency H1. This is because, as described above, the SPS device 40 also causes a shift in the frequency, and recognizes the frequency of the signal S1 as SH1a. In other words, the frequency SH1a is not the actual frequency of the signal received by the SPS device 40 but an apparent frequency as recognized by the SPS device 40. The SPS device 40 needs to synchronize itself with the apparent frequency SH1a in order to search for the signal S1. In other words, when the SPS device 40 acquires the signal S1, the SPS device 40 is synchronized with the apparent frequency SH1a. Thus, the apparent frequency SH1a is also referred to as an acquisition frequency.

The shift of the frequency on the SPS device 40 side is generally referred to as a drift. In other words, the difference between the frequency H1 changed by the Doppler effect DP and the acquisition frequency SH1a is the drift.

The change from the frequency H1 to the frequency SH1a (referred to as total drift) is caused by a factor on the SPS device 40 side. However, as shown in FIG. 3, this total drift includes an initial estimated drift D1, which is a shift of the frequency estimated in advance, and a drift error D2. Detailed explanation of the drift will be given below.

At the time when positioning is started, the SPS device 40 estimates and keeps information indicating the initial estimated drift D1 in advance. However, the SPS device 40 cannot determine the drift error D2. The SPS device 40 starts a search setting the synchronizing frequency as a frequency H2, which takes into account the Doppler effect DP and the initial estimated drift D1. This initial synchronizing frequency is also referred to as an initial search frequency H2.

The SPS device 40 carries out searches one by one, gradually shifting the search frequency further above and below the synchronizing frequency H2, first at a first search frequency Sr1, then at a second search frequency Sr2, then at a third search frequency Sr3, and so on. In this embodiment, for example, the SPS device 40 acquires the frequency SH1a at an eighth search frequency Sr8 and locates the SPS satellite 12a.

Next, details of the drift will be explained.

FIG. 4 is a conceptual diagram for explaining the drift.

First, the difference between absolute time as measured by the SPS satellites 12a-12t and time as measured by the terminal 30 having the SPS device 40 will be explained using FIG. 4(a).

A specification frequency of the crystal oscillator 41 in FIG. 2 is H1 (e.g., 27.456×10$^6$) times per T1 second (one second in the absolute time) when an atmospheric temperature is 25 degrees (° C.). In other words, the specification frequency of the crystal oscillator 41 is H1 hertz (Hz). Thus, the SPS device 40 recognizes that H1-times oscillations of the crystal oscillator 41 correspond to one second. As long as the crystal oscillator 41 maintains the specification frequency at H1 hertz, one second for the SPS device 40 is equal to one second T1 in the absolute time.

However, in some cases, oscillation performance of the crystal oscillator 41 fluctuates due to an atmospheric temperature. In this embodiment, as shown in FIG. 4(a), the frequency of the oscillation shifts by A (e.g., 10) hertz, and the crystal oscillator 41 finishes oscillating H1 times before the period of T1 seconds elapses. In this case, the crystal oscillator 41 oscillates H1+A times (H11 times) in the period of T1 in the absolute time. In other words, the oscillation of H11 times corresponds to one second in the absolute time.

On the other hand, one second as measured by the SPS device 40 has elapsed at the point when the crystal oscillator 41 oscillated H1 times. This means that one second as measured by the SPS device 40 is in fact T2 absolute second, which is H1/H11 times the absolute time T1. When H1 is 27.456×10$^6$ and A is 10 as described above, since T2 is H1/H11, T2 or one second as measured by the SPS device 40 is 0.999999636 second in the absolute time.

In this way, since discrepancies arise between the time on the SPS device 40 side and the absolute time due to the fluctuation in the oscillations, discrepancies also arise between the frequency that reaches the SPS device 40 as measured by the absolute time and the frequency that reaches the SPS device 40 as recognized by the SPS device 40.

Next, the drift will be explained using FIG. 4(b).

Note that, although the frequency changes due to the Doppler effect, the drift explained below is a shift of the frequency due to a factor on the crystal oscillator 41 side.

Figure 4A:
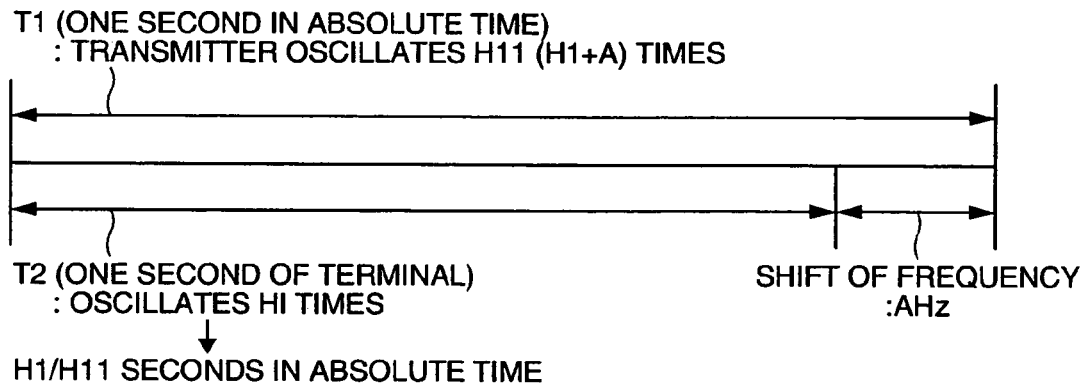
FIGS. 4A and 4B are conceptual diagrams for explaining drift.
Figure 4B:
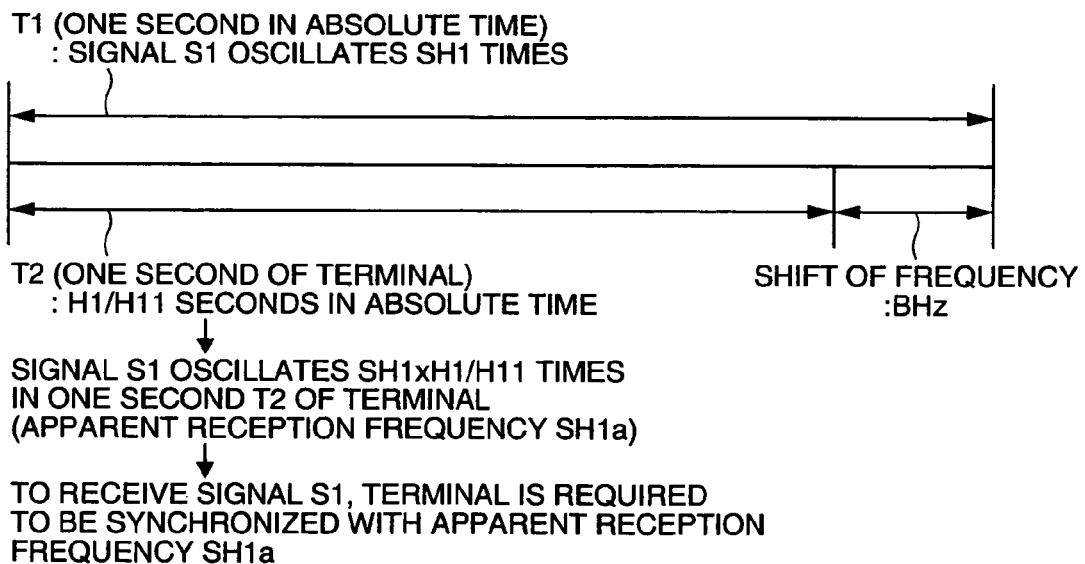

As shown in FIG. 4(b), for example, the signal S1 from the SPS satellite 12a oscillates SH1 (e.g., 1575.42×10$^6$) times in one absolute second when it reaches the terminal 30. In other words, the signal S1 is SH1 hertz as measured in the absolute time.

However, in the period of T2, which is one second as measured by the SPS device 40 as shown in FIG. 4(a), the signal S1 oscillates only SH1×T2 (e.g., 1575.419426×10$^6$) times. In other words, the signal S1, which oscillates SH1 times in one second T1 in the absolute time, oscillates only SH1×T2 times in the period of T2, which is one second as measured by the SPS device 40. Thus, a frequency shift B occurs between the frequency in one second T1 in the absolute time of the signal S1 and the frequency in one second T2 as measured by the SPS device 40. This shift B of a frequency is generally referred to as drift or a drift amount.

In order to search for the signal S1 and locate the satellite 12a, the SPS device 40 needs to search for a signal at the frequency SH1×T2 hertz as measured by the SPS device 40, rather than the frequency SH1 hertz in the absolute time T1 of the signal S1. In other words, the SPS device 40 needs to search for a signal of the apparent reception frequency SH1a, which SH1×T2 hertz.

The search for a signal of the reception frequency SH1a is performed by main hardware configuration of the terminal 30 explained above and main software configuration or the like to be explained below.

Main Software Configuration of the Terminal 30

Figure 5:
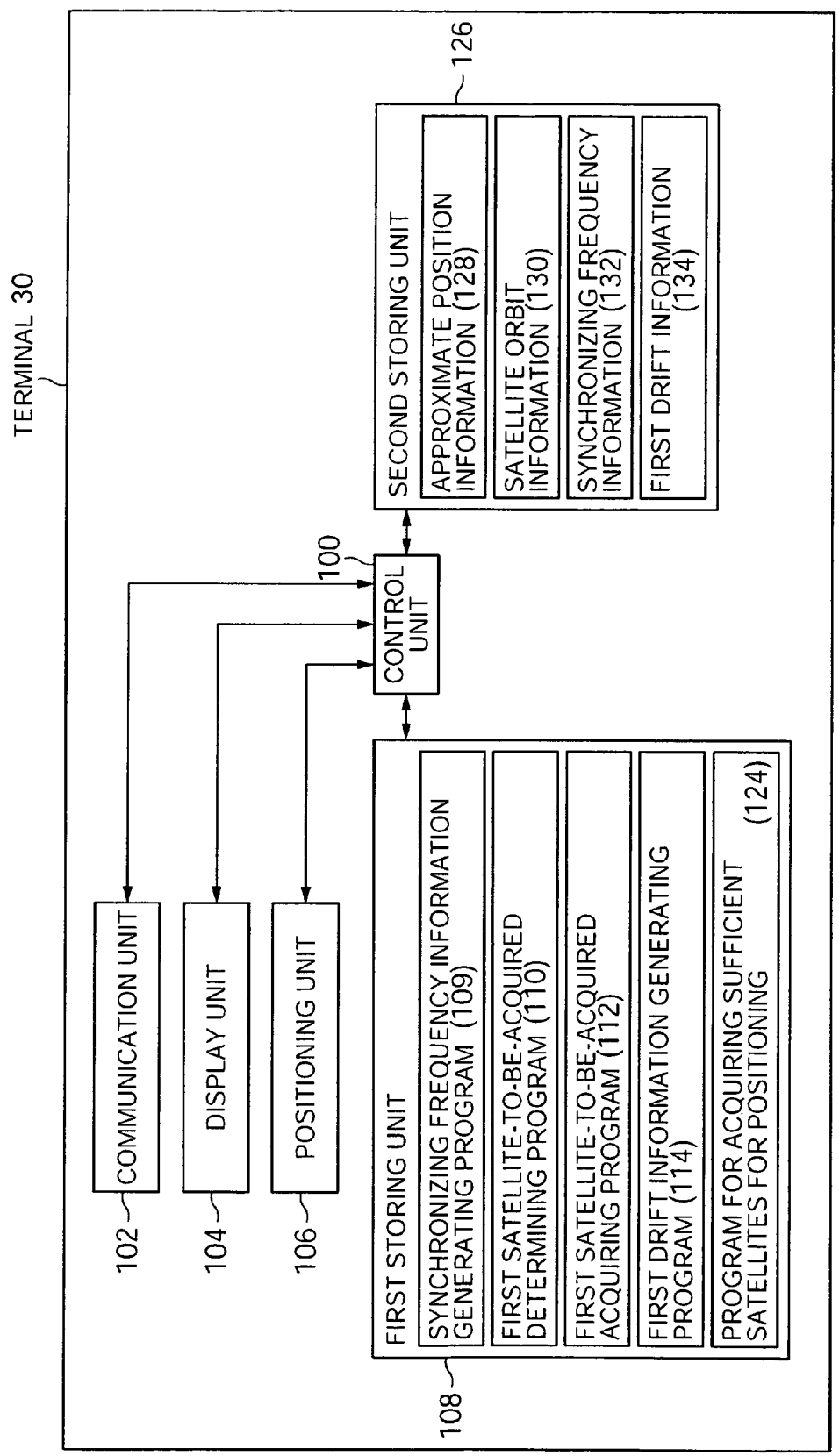
FIG. 5 is a schematic diagram of a main software configuration of the terminal apparatus in accordance with the first embodiment of the invention.

FIG. 5 is a schematic diagram showing a main software configuration of the terminal 30.

As shown in FIG. 5, the terminal 30 has a communication unit 102 that corresponds to the communication device 42 in FIG. 2, a display unit 104 that corresponds to the display device 44 in FIG. 2, and a positioning unit 106 that corresponds to the SPS device 40 in FIG. 2. The terminal 30 also has a control unit 100 that controls each of the units operatively connected thereto. Further, the terminal 30 has a first storing unit 108 that stores various programs and a second storing unit 126 that stores various kinds of information.

More specifically, the first storing unit 108 stores a synchronizing frequency information generating program 109, a first satellite-to-be-acquired determining program 110, a first satellite-to-be-acquired capturing program 112, a first drift information generating program 114, and a program for acquiring sufficient satellites for positioning 124, among other conventional programs. The second storing unit 126 stores approximate position information 128, satellite orbit information 130, synchronizing frequency information 132, and first drift information 134.

As shown in FIG. 5, a first satellite-to-be-acquired determining program 110 is stored in the first storing unit 108. The first satellite-to-be-acquired determining program 110 is information for determining the first SPS satellite to be searched for and located (a first satellite-to-be-acquired) among the SPS satellites 12a-12t in FIG. 1. In other words, the first satellite-to-be-acquired determining program 110 and the control unit 100 are examples of the first satellite-to-be-acquired determining means that determines the first satellite to locate from the plurality of SPS satellites 12a-12t.

More specifically, using approximate position information 128 and satellite orbit information 130 stored in the second storing unit 126, the control unit 100 calculates elevation angles of each of the SPS satellites 12a-12t and determines as the first satellite-to-be-acquired a SPS satellite that has the highest signal intensity and appears to be locatable most promptly. The approximate position information 128 is information indicating an approximate position of the terminal 30, for example, information indicating a located position during the last positioning. The satellite orbit information 130 is information indicating orbits of the SPS satellites 12a-12t that are received from the SPS satellites 12a-12t and stored during the last positioning.

In addition, as shown in FIG. 5, the terminal 30 has a first satellite-to-be-acquired capturing program 112. The first satellite-to-be-acquired capturing program 112 is used by the control unit 100 to locate the first satellite-to-be-acquired, for example the SPS satellite 12a, which is determined by the first satellite-to-be-acquired determining program 110. The control unit 100 locates the SPS satellite 12a using all the usable search units 40a-40t in accordance with the first satellite-to-be-acquired capturing program 112.

In other words, the first satellite-to-be-acquired capturing program 112 and the control unit 100 are examples of the first satellite-to-be-acquired acquiring means that acquires the first satellite-to-be-acquired using all of the usable search unit 40a-40t shown in FIG. 2.

As shown in FIG. 5, the terminal 30 also has a synchronizing frequency information generating program 109. The synchronizing frequency information generating program 109 is used by the control unit 100 to generate synchronizing frequency information 132 taking into account the frequencies of the signals S1 -S4 transmitted from the SPS satellites 12a-12t, the Doppler effect DP (see FIG. 3) which is different for each of the SPS satellites 12a-12t, and the initial estimated drift D1 (see FIG. 3) which is common to all the SPS satellites 12a-12t.

The control unit 100 stores the generated synchronizing frequency information 132 in the second storing unit 126 of the terminal.

The synchronizing frequency information 132 is information indicating a synchronizing frequency that is used by the control unit 100 to capture the SPS satellites 12a-12t with the positioning unit 106. In other words, the synchronizing frequency information 132 is an example of synchronizing frequency information indicating a terminal side synchronizing frequency for capturing the SPS satellites 12a-12t, and the second storing unit 126 is an example of the synchronizing frequency storing means.

As described above, the synchronizing frequency is set based on the frequencies at the time of transmission of the signals S1-S4 from the respective SPS satellites 12a-12t, the Doppler effect DP (see FIG. 3), and the initial estimated drift D1 (see FIG. 3).

Note that, unlike in this embodiment, the synchronizing frequency may be set on based on only the frequencies at the time of transmission of the signals S1 -S4 and the Doppler effect. In other words, the frequency H1 in FIG. 3 may be set as the synchronizing frequency.

Searches

Figure 6:
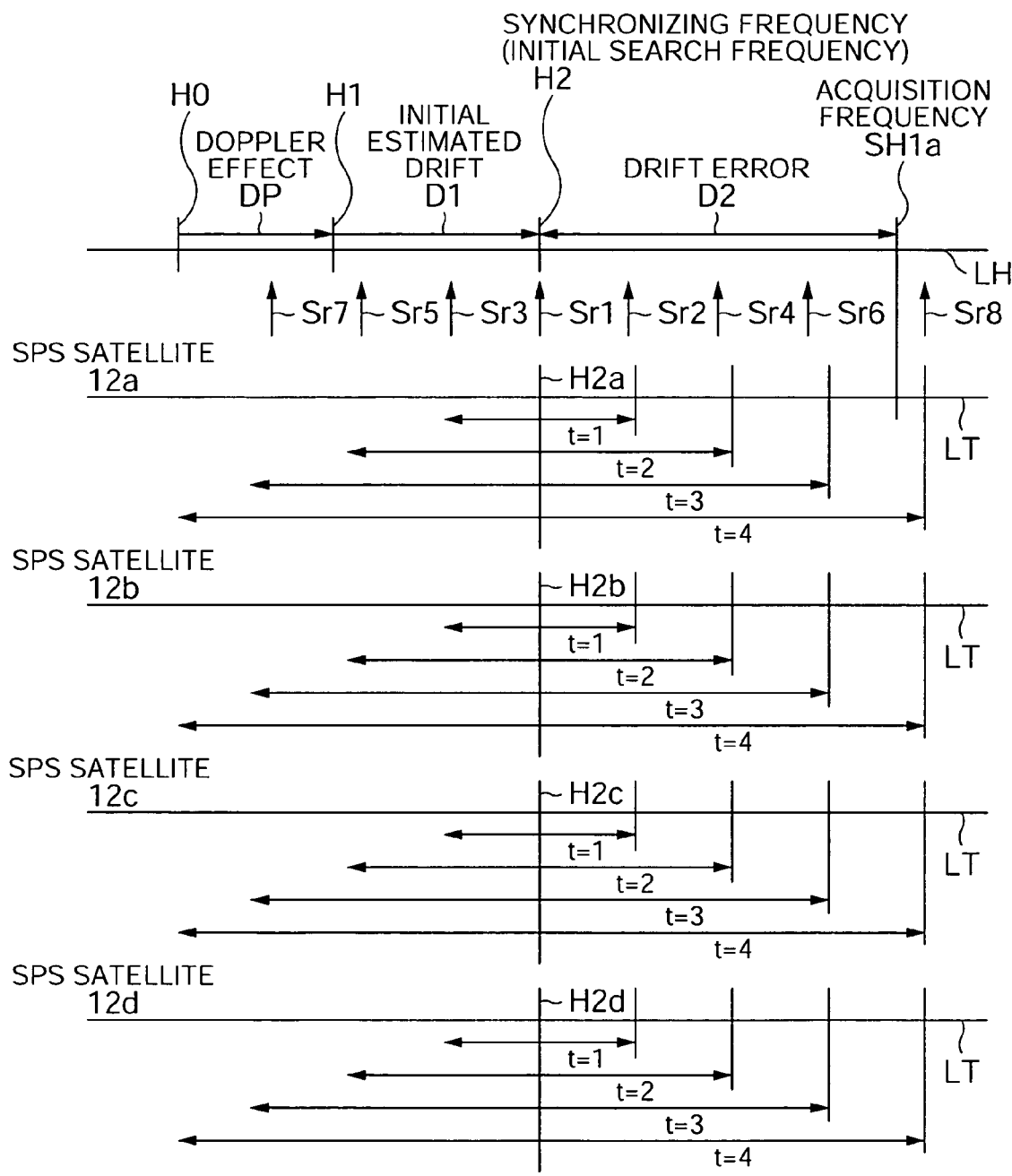
FIG. 6 is a conceptual diagram showing an example of the conventional search.
Figure 7:
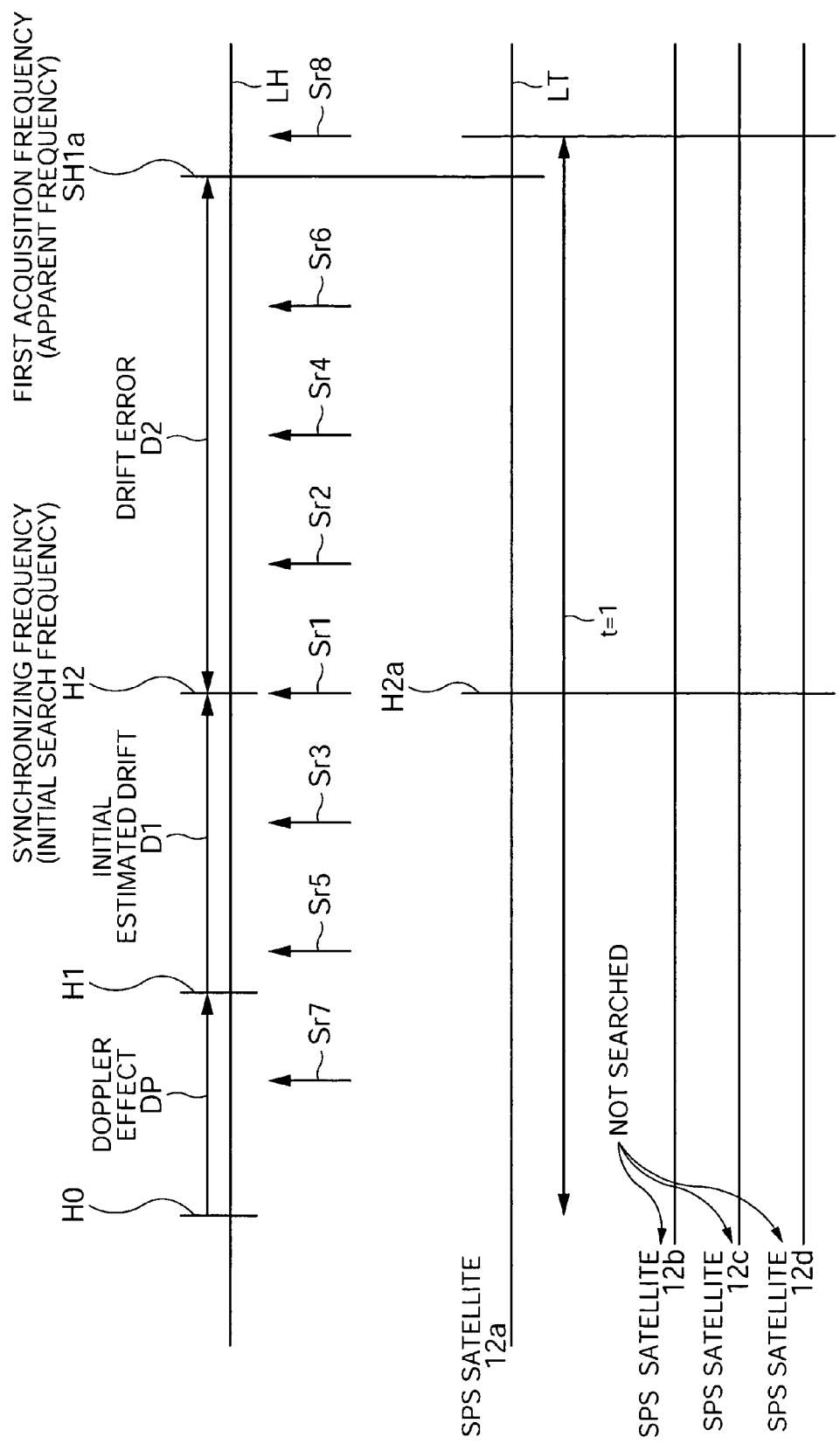
FIG. 7 is a conceptual diagram showing the search in accordance with the first embodiment of the invention, where only the first satellite-to-be-acquired is being searched.
Figure 8:
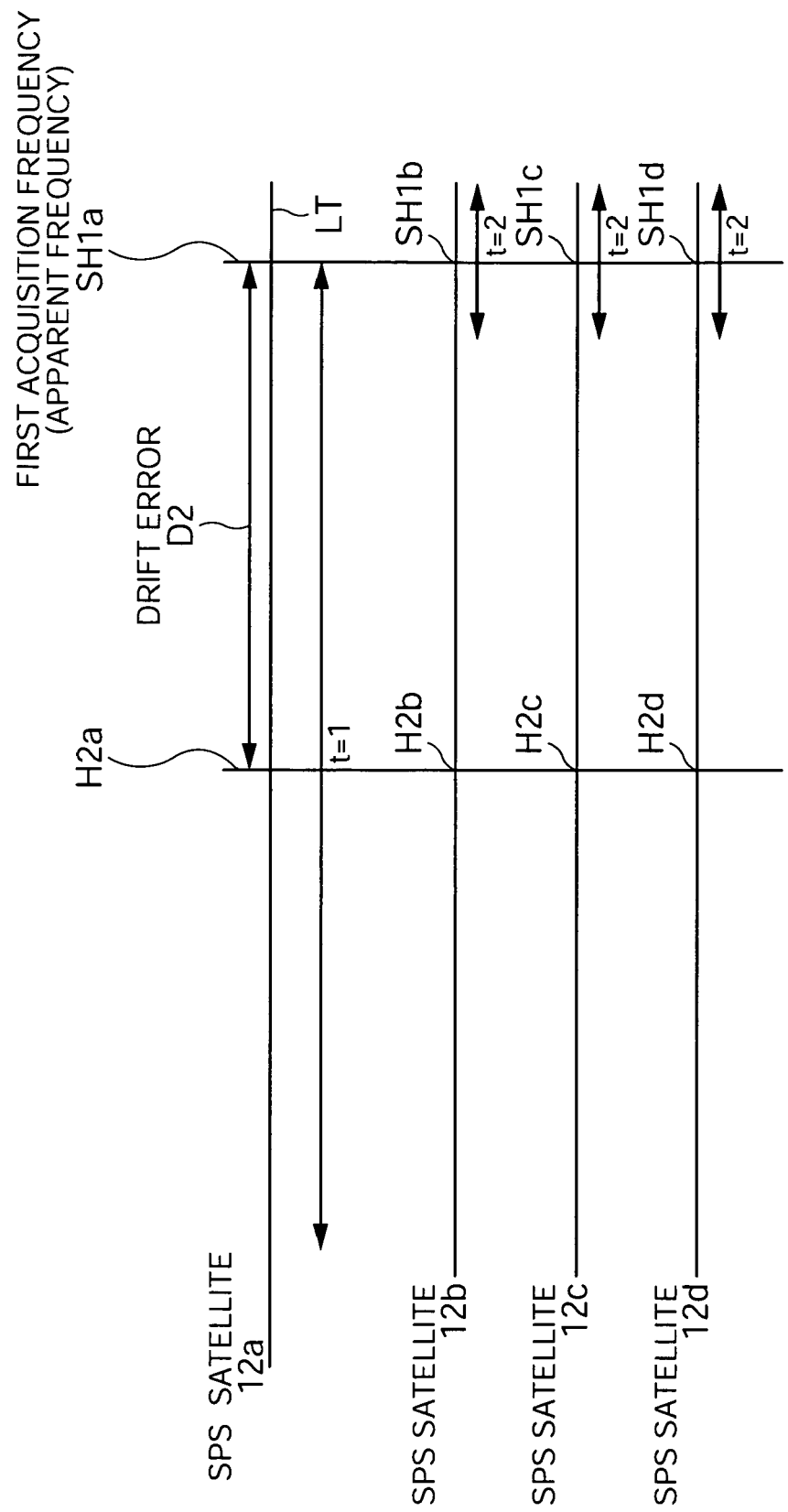
FIG. 8 is a conceptual diagram showing the search in accordance with the first embodiment of the invention.

FIGS. 6, 7, and 8 are diagrams showing examples of searches.

FIG. 6 shows an example of a general search operation to be compared with a search performed by the terminal 30.

As shown in FIG. 6, when the search units 40a to 40t shown in FIG. 2 are allocated to synchronizing frequencies (initial search frequencies) H2a to H2d to search for the respective SPS satellites 12a to 12d. The synchronizing frequencies of the respective SPS satellites 12a are indicated in the synchronizing frequency information 132. In the search shown in FIG. 6, the amount of time t required for capturing the respective SPS satellites 12a-12d is 4. The terminal 30, however, does not perform the search shown in FIG. 6.

FIG. 7 shows an example of the search performed by the terminal 30.

As shown in FIG. 7, the control unit 100 of the terminal 30 determines that the SPS satellite 12a can be captured most promptly, and selects the SPS satellite 12a as a first satellite-to-be-acquired based on the first satellite-to-be-acquired determining program 110. The control unit 100 captures the SPS satellite 12a using all the usable search units 40a-40t shown in FIG. 2 based on the first satellite-to-be-acquired capturing program 112. Since the control unit 100 searches for and captures the SPS satellite 12a using all the search units 40a-40t without allocating the search power to other SPS satellites, the time t required for acquiring the SPS satellite 12a is only 1. In this case, the control unit 100 does not search for other SPS satellites than the SPS satellite 12a.

The frequency at the time when the positioning unit 106 searches for the SPS satellite 12a for acquiring is referred to as a first capturing frequency. This first capturing frequency is not always identical with the synchronizing frequency indicated by the synchronizing frequency information 132.

As shown in FIG. 5, the terminal 30 has a first drift information generating program 114. The first drift information generating program 114 is used by the control unit 100 to generate difference information, which indicates a difference between the first capturing frequency and the synchronizing frequency that corresponds to the SPS satellite 12a and is indicated by the synchronizing frequency information 132. In other words, the first drift information generating program 114 and the control unit 100 are examples of first difference information obtaining means that obtains first difference information, which indicates a difference between the synchronizing frequency and the first capturing frequency at which the first satellite-to-be-acquired is captured.

More specifically, the control unit 100 generates first drift information 134 (see FIG. 5) according to the first drift information generating program 114. The first drift information 134 indicates a drift error D2, which is a difference between the first capturing frequency SH1a and the initial search frequency H2 in FIG. 7, which is the synchronizing frequency indicated by the synchronizing frequency information 132.

Then, the control unit 100 stores the generated first drift information 134 in the second storing unit 126 as shown in FIG. 5.

As described above, this shift (see FIG. 8) between the first capturing frequency SH1a and this synchronizing frequency (the initial search frequency) H2a (see FIG. 8) is referred to as a drift error D2.

As shown in FIG. 5, the terminal 30 has a program for acquiring sufficient satellites for positioning 124. The program for acquiring sufficient satellites for positioning 124 is used by the control unit 100 to acquire sufficient number of SPS satellites 12b-12d that are required for positioning the terminal unit 30 using the first drift information 134 indicating the drift error D2. In other words, the program for acquiring sufficient satellites for positioning 124 and the control unit 100 are examples of the means for acquiring sufficient satellites for positioning that acquires sufficient number of SPS required for positioning using the first drift information 134.

More specifically, the control unit 100 searches for sufficient number of SPS satellites 12b-12d required for positioning, using the synchronizing frequencies SH1b-SH1d as shown in FIG. 8, using the first drift information 134 (see FIG. 5) indicating the drift error D2. In other words, the control unit 100 corrects the initial search frequencies H2b-H2d of the respective SPS satellites 12b-12d using the drift error D2 indicated by the first drift information 134, and searches for the SPS satellites 12b-12d using new corrected synchronizing frequencies. This time the search power is allocated to searches of the requisite number of satellites.

The control unit 100 can calculate the Doppler effect of signals from the respective SPS satellites 12b-12d according to the approximate position information 128 and the satellite orbit information 130 in FIG. 5. In addition, since the first drift information 134 is information that pertains to the SPS device 40, the control unit 100 uses the first drift information 134 commonly in searches for the SPS satellites 12b-12d other than the SPS satellite 12a, using the program for acquiring sufficient satellites for positioning 124. Therefore, as shown in FIG. 8, it is possible to start the searches for the SPS satellites 12b-12d with the synchronizing frequencies SH1b-SH1d, which are estimated acquisition frequencies of the signals S2-S4 sent from the SPS satellites 12b-12d. As described above, since the first drift information 134 is obtained by actual measurement and therefore accurate, the synchronizing frequencies SH1b-SH1d, which are set based on the first drift information 134, are extremely close to the acquisition frequencies at which the SPS satellites 12b-12d are actually acquired. Therefore, it is possible to complete acquisition of all necessary SPS satellites 12b-12d promptly even if search power is distributed.

In other words, the time t necessary for the acquisition of the SPS satellites 12b-12d may be, for example, only one. Consequently, including the time t for acquiring the first satellite-to-be-acquired 12a is set to one, the time t required for acquiring all the other necessary SPS satellites 12b-12d may be only two.

Operation Example of the Terminal 30

The terminal 30 is constituted as described above. An operation example of the terminal 30 will be hereinafter explained.

Figure 9:
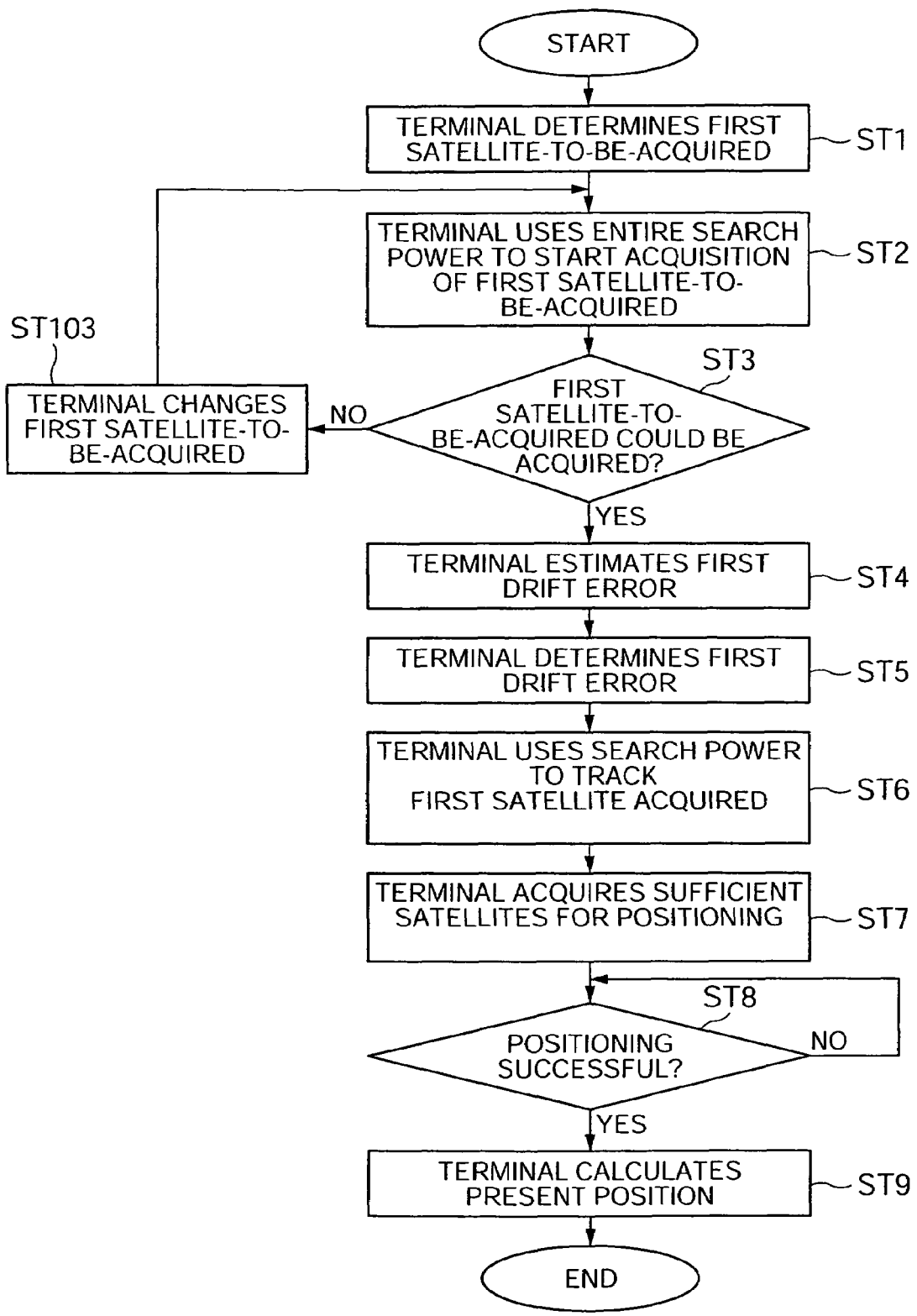
FIG. 9 is a flowchart showing the positioning operation of the terminal apparatus in accordance with the first embodiment of the invention.

FIG. 9 is a schematic flowchart showing the operation example of the terminal 30.

In step ST1, the terminal 30 in FIG. 1 selects as a first satellite-to-be-acquired a SPS satellite that is estimated to be acquirable most promptly based on the approximate position information 128 and the satellite orbit information 130 in FIG. 5. In this example, the SPS satellite 12a is selected among the SPS satellites 12a-12d.

In other words, step ST1 is an example of a first satellite-to-be-acquired determining step in which the terminal 30 determines the first satellite-to-be-acquired from the plurality of SPS satellites 12a-12d.

Subsequently, the terminal 30 uses entire search power to start a process of searching and acquiring the SPS satellite 12a, which is the first satellite-to-be-acquired (step ST2).

In other words, step ST2 is an example of a first satellite-to-be-acquired acquiring step in which the terminal 30 acquires the first satellite-to-be-acquired using all usable searching means.

In step ST2, as shown in FIG. 7, the terminal 30 starts a search, using, for example, the frequency H2 as the initial search frequency. The frequency H2 is generated with the initial estimated drift D1, which is a drift at the time of last positioning, and the Doppler effect DP stored in the second storing unit in FIG. 5.

Subsequently, the terminal 30 determines whether the SPS satellite 12a, which is the first satellite-to-be-acquired, has been acquired (step ST3). If the SPS satellite 12a could be acquired, the terminal 30 estimates the first drift error D2 (see FIG. 7) in step ST4, and determines the first drift error D2 in step ST5.

In other words, step ST4 is an example of a first difference information obtaining step in which the terminal 30 obtains the first drift information 134 (the first difference information) indicating the difference between the terminal side synchronizing frequency corresponding to the first satellite-to-be-acquired and a first capturing frequency at which the first satellite-to-be-acquired is acquired.

The control unit 100 estimates the first drift error D2 as a difference between the initial search frequency, which is a synchronizing frequency, and a frequency at which the SPS satellite 12a is acquired.

Subsequently, the terminal 30 uses some of the search power to track the SPS satellite 12a, which is the first satellite-to-be-acquired (step ST6). As the search power for tracking, for example, four of the search units 40a-40t shown in FIG. 2 are utilized.

Concurrently with step ST6, the terminal 30 acquires other satellites required for positioning (step ST7). At this point, the terminal 30 uses the first difference information, in other words the first drift information 134.

In other words, step ST7 is an example of the step of acquiring sufficient satellites for positioning, in which the terminal 30 acquires a sufficient number of SPS required for positioning using the first difference information.

In the case of the three-dimensional positioning, four or more of the SPS satellites need to be acquired for the positioning. However, since the SPS satellite 12a has already been acquired and now being tracked in step ST6, three or more SPS satellites are required anew for the positioning. As shown in FIG. 8, since new synchronizing frequencies SH1b-SH1d that are obtained by correcting the initial search frequencies H2b-H2d based on the first differe the SPS satellites 12b-12d promptly.

Note that, unlike in this embodiment, the terminal 30 can be configured to receive signals from more SPS satellites than it needs for the purpose of positioning, and select the SPS satellites that have least positioning errors from among the acquired SPS satellites to perform the positioning.

Once the terminal 30 acquires sufficient number of SPS satellites, the terminal 30 performs the positioning, and determines whether the positioning has been performed successfully. When the positioning is determined to be successful in step ST8, the terminal 30 calculates the present position in step ST9, and displays the present position with the display unit 104 in FIG. 5 to end the operation.

As described above, the terminal 30 acquires, for example, the SPS satellite 12a, which is the first satellite-to-be-acquired, using all the usable searching means. Thus, the terminal 30 can acquire one SPS satellite 12a in a shorter time than in the case where the search power is allocated to searches of a plurality of SPS satellites.

When the SPS satellite 12a is acquired, the first capturing frequency used by the SPS receiver 40 for the acquisition of the SPS satellite 12a is obtained. The terminal 30 acquires others SPS satellites 12b-12d required for positioning (e.g., three satellites beside the SPS satellite 12a) using the first difference information indicating the difference between the first capturing frequency and the terminal side synchronizing frequency.

Since the first difference information indicates the shift of the synchronizing frequency (a drift error), it is possible to correct the shift of the synchronizing frequency using the first difference information and acquire the second and subsequent SPS satellites 12b-12d promptly to perform positioning.

Consequently, even when there has been a change in the amount of shift of the synchronizing frequency since the last time when the positioning was performed, it is possible to acquire the SPS satellites 12a-12d promptly to perform positioning.

In addition, since it is unnecessary to provide data that indicate a relation between a drift amount specific to each crystal oscillator and temperature. Thus, there is no need to provide a circuit for measuring the temperature in the terminal 30. Therefore, it is possible to reduce the size and the manufacturing cost of the terminal 30.

Second Embodiment

Next, a second embodiment of the present invention will be explained.

A structure of a terminal 31 in the second embodiment has many components that are common with the structure of the terminal 30 in accordance with the first embodiment. Thus, the common components are denoted by the identical reference numerals. Explanations of such components are omitted, and only components and processes that are different from those of the first embodiment will be hereinafter mainly explained.

In the second embodiment, after the first satellite-to-be-acquired is acquired, a predetermined number of search units are set aside for the purpose of tracking the first acquired satellite. Then, a second satellite-to-be-acquired is selected from among the remaining SPS satellites, and all of the remaining search units are utilized to acquire the second satellite-to-be-acquired.

Software Configuration of Terminal 31

Figure 10:
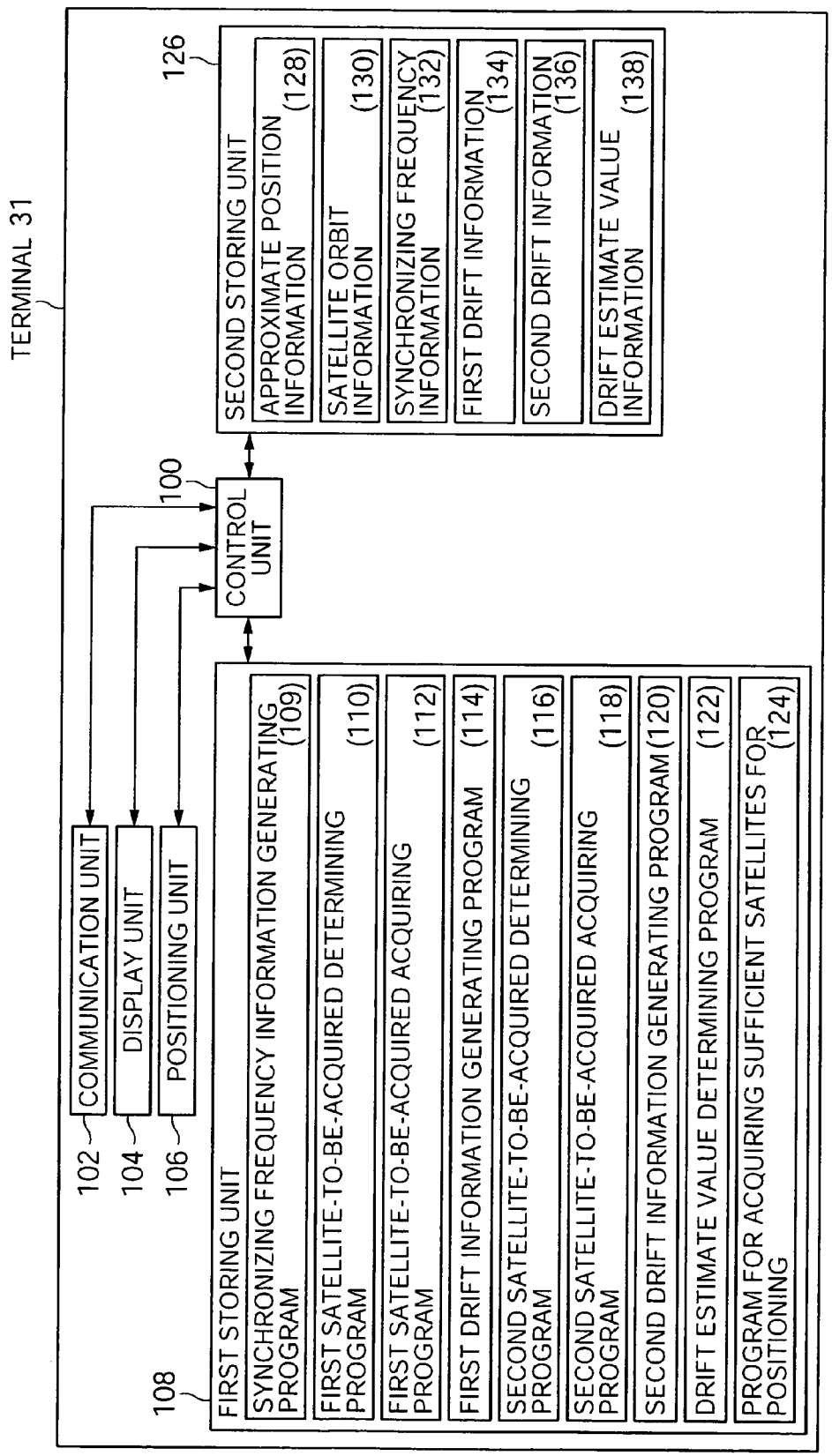
FIG. 10 is a schematic diagram showing a main software configuration of the terminal apparatus in accordance with the second embodiment of the invention.

FIG. 10 is a schematic diagram showing a main software configuration and the like of the terminal 31 according to the second embodiment.

As shown in FIG. 10, in the second embodiment, besides the programs stored in the first storing unit 108 of the first embodiment, a second satellite-to-be-acquired determining program 116, a second satellite-to-be-acquired acquiring program 118, a second drift information generating program 120, and a drift estimated value determining program 122 are stored in the first storing unit 108 of the terminal 31. Similarly, the second storing unit 126 further includes second drift information 136 and drift estimate value information 138, beside the information stored in the second storing unit 126 in the first embodiment.

The second satellite-to-be-acquired determining program 116 is used by the control unit 100 to determine a second satellite to be acquired. In other words, the second satellite-to-be-acquired determining program 116 and the control unit 100 are examples of second satellite-to-be-acquired determining means that selects the second satellite to be acquired from among the SPS satellites 12a-12d.

According to the second satellite-to-be-acquired determining program 116, the control unit 100 selects as the second satellite-to-be-acquired a SPS satellite that is estimated to be acquirable promptly, based on the approximate position information 128 and the satellite orbit information 130 shown in FIG. 10.

The second satellite-to-be-acquired acquiring program 116 is used by the control unit 100 to acquire the second satellite-to-be-acquired with the positioning unit 106. In other words, the second satellite-to-be-acquired acquiring program 116, the control unit 100, and the positioning unit 106 are examples of second satellite-to-be-acquired acquiring means that acquires the second satellite-to-be-acquired using all usable searching means.

Figure 15:
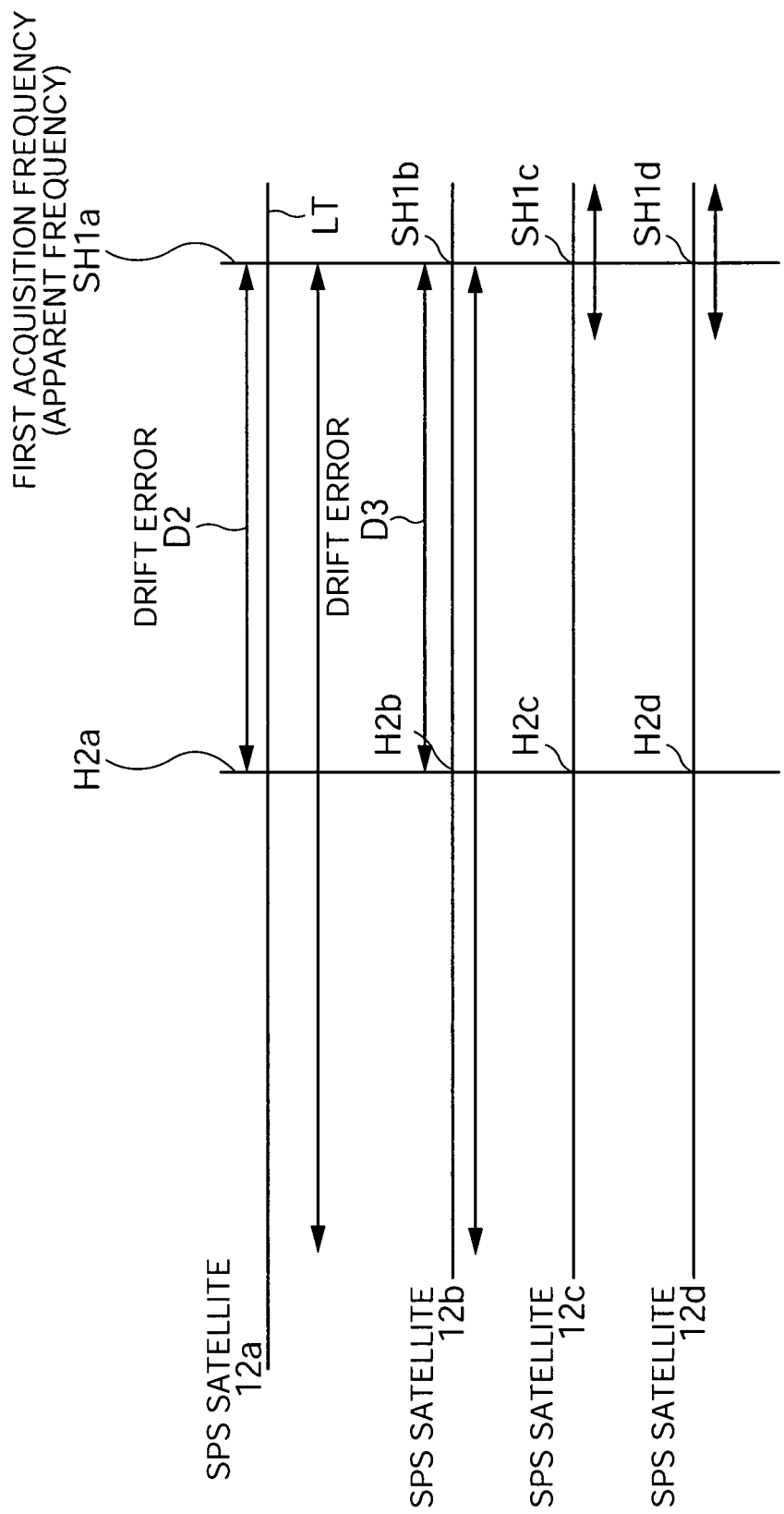
FIG. 15 is a conceptual diagram showing the search in accordance with the second embodiment of the invention.

Here, in order to track the SPS satellite 12a, which is the first satellite-to-be-acquired, five search units out of the search power, for instance the search units 40a to 40e shown in FIG. 2, are utilized. Thus, search power available for acquiring the second satellite-to-be-acquired, for example the SPS satellite 12b, is fifteen, which include consisting the search units 40f to 40t. It is possible to acquire the SPS satellite 12b promptly by searching the second acquisition object satellite, for example the SPS satellite 12b, with the search power of fifteen, since other SPS satellites 12c-12d are not being searched.

accordance with the second satellite-to-be-acquired acquiring program 118, the control unit 100 searches the second satellite-to-be-acquired using all of the remaining searching means excluding the search power set aside for the tracking. More specifically, the control unit 100 determines the initial search frequency H2b based on the Doppler effect DP and the initial estimated drift D1 as shown in FIG. 15.

Note that the positioning unit 106, which tracks the SPS satellite 12a that is the first satellite-to-be-acquired, is an example of the first acquisition satellite tracking means.

Here, the frequency at which the positioning unit 106 searches and acquires the SPS satellite 12b is referred to as the second acquisition frequency SH1b. This second acquisition frequency SH1b is not necessarily the same as with the synchronizing frequency H2b indicated by the synchronizing frequency information 132. In addition, the second acquisition frequency SH1b is not necessarily the same as the first acquisition frequency SH1a.

The second drift information generating program 120 is used by the control unit 100 to generate second difference information D3, which indicates a difference between the second acquisition frequency SH1b and the synchronizing frequency H2b that is indicated by the synchronizing frequency information 132. In other words, the second drift information generating program 120 and the control unit 100 are examples of the second difference information obtaining means that obtains second difference information indicating a difference between a synchronizing frequency H2n corresponding to the satellite-to-be-acquired or the SPS satellite 12b and the second acquisition frequency SH1b at which the satellite-to-be-acquired is acquired.

Details of the second drift information generating program 120 are the same as those of the first drift information generating program 114.

The control unit 100 stores the generated second drift information 136 in the second storing unit 126 shown in FIG. 10.

The second drift estimate value determining program 122 is used by the control unit 100 to determine an estimated drift value. The control unit 100 acquires other SPS satellites up to a number sufficient for positioning, according to the program for acquiring sufficient satellites for positioning 124 shown in FIG. 10, using the estimated drift value determined by the drift estimate value determining program 122. In other words, unlike in the first embodiment, the program for acquiring sufficient satellites for positioning 124 and the control unit 100, which are examples of means for acquiring sufficient number of satellites for positioning, acquire a sufficient number of SPS satellites 12c-12d for positioning using the first drift information 134 (the first difference information) and the second drift information 136 (the second difference information).

More specifically, using the drift estimate value determining program 122, the control unit 100 determines that the first drift information 134 (or the second drift information 136) is accurate if the drift error indicated by the first drift information 134 and the drift error indicated by the second drift information 136 in FIG. 10 are substantially equal. The control unit 100 searches and acquires other SPS satellites 12c-12d up to a number required for the positioning, using the first drift information 134 or the second drift information 136.

Here, the drift error indicated by the first drift information 134 and the drift error indicated by the second drift information 136 in FIG. 10 are substantially equal in the following case.

A drift, which is estimated to fluctuate in, for example, ten seconds between the time when the first drift information 134 is generated and the time when the second drift information 136 is generated, is referred to as an inevitable drift fluctuation. The maximum value of this inevitable drift fluctuation can be estimated according to factors such as a heat value of the terminal 31 itself, and a temperature characteristic of the crystal oscillator 41. If a difference between the drift error indicated by the first drift information 134 and the drift error indicated by the second drift information 136 (hereinafter referred to as drift difference) is within the maximum value of the inevitable drift fluctuation, for example, 40 hertz, then the drift error indicated by the first drift information 134 and the drift error indicated by the second drift information 136 are regarded as being substantially equal. Note that 40 hertz is an example of the values of the maximum value of the inevitable drift obtained experimentally.

Incidentally, for example, the searches Sr1 and the like shown in FIG. 7 are performed at an interval of a predetermined frequency interval (a search step), such as 50 Hz.

Therefore, even if the inevitable drift fluctuation is extremely small, the minimum value of a drift difference, which can be detected by the terminal 31, is by a unit of the search step.

Thus, if the drift difference is equal to or smaller than a larger one of the maximum value of the inevitable drift fluctuation and the search step, the control unit 100 of the terminal 31 determines that the drift error indicated by the first drift information 134 and the drift error indicated by the second drift information 136 are substantially equal.

In other words, when the maximum value of the inevitable drift fluctuation is 40 Hz and the search step is 50 Hz, for example, the control unit 100 determines that the drift errors indicated by the first drift information 134 and the drift error indicated by the second drift information 136 are substantially equal if the drift difference is within 50 Hz.

Note that, unlike in this embodiment, the control unit 100 can alternatively determine that the drift error indicated by the first drift information 134 and that indicated by the second drift information 136 are substantially equal if the drift difference is within the inevitable drift fluctuation or the search step, without comparing the maximum value of the inevitable drift fluctuation and the search step.

When the control unit 100 determines that the drift error indicated by the first drift information 134 and the drift error indicated by the second drift information 136 are substantially equal according to the method described above, the control unit 100 stores the first drift information 134 and the second drift information 136 in the second storing unit 126 as drift estimate value information 138.

Then, the control unit 100 uses this drift estimate value information 138 to acquire the SPS satellites 12c-12d required for positioning.

In the case of the three-dimensional positioning, it is necessary to receive signals from four or more SPS satellites in total. However, since the SPS satellites 12a and the SPS satellites 12b have been acquired, the positioning unit 106 in FIG. 10 continues to track the SPS satellites 12a and 12b. Therefore, there are two more SPS satellites necessary for positioning other than the SPS satellite 12a and the SPS satellite 12b.

As described above, for example, five search units 40a-40t (see FIG. 2) are used for tracking one SPS satellite. Thus, for the tracking of the two SPS satellites 12a and 12b, ten search units 40a to 40j are utilized. Then, the ten search units 40k-40t remain as the remaining search power, excluding from the total twenty search units 40a-40t of the SPS device 40 in FIG. 2 the ten search units reserved for tracking the two SPS satellites 12a and 12b. These remaining search units 40k-40t are equally divided between two SPS satellites to be searched and acquired, for example the SPS satellite 12c and the SPS satellite 12d.

In other words, the control unit 100 in FIG. 10 excludes the search units required for tracking the first satellite-to-be-acquired and the second satellite-to-be-acquired from all the usable search units 40a-40t, equally divides the remaining units 40k-40t with the remaining number of satellites required for the positioning, and acquires a sufficient number of SPS required for positioning based on the program for acquiring sufficient satellites for positioning 124.

As described above, since the terminal 31 also uses the second drift information 136 (the second difference information), the terminal 31 can acquire the SPS satellites 12c-12d required for positioning after verifying that the drift of the synchronizing frequency (the drift error) indicated by the first drift information 134 (the first difference information) is accurate. In addition, when the accuracy of the first difference information is verified, the accuracy of the second difference information is also verified simultaneously.

Consequently, it is possible to acquire a position information satellite promptly to perform positioning using the first difference information or the second difference information, after verifying the accuracy of such difference information.

Note that, when the positioning unit 106 cannot track, for example, the SPS satellite 12a which is the first satellite-to-be-acquired, the terminal 31 selects the first satellite-to-be-acquired again.

This is partly because there are an abundance of radio waves (electromagnetic waves) due to the recent development of various radio systems. Therefore, the terminal 31 may erroneously recognize that a signal from one of the SPS satellites 12b-12d is received, when in fact it is a signal other than the signal from one of the SPS satellite 12b-12d (hereinafter referred to as a wrong signal) that is received. In the case of the wrong signal, since the first difference information is inaccurate, the first difference information cannot be used for acquisition of other SPS satellites 12c and the like.

Furthermore, in the case of this wrong signal, since the wrong signal does not carry a position related signal that would be carried by an actual signal from one of the SPS satellite 12b-12d, the terminal 31 cannot track the SPS satellite 12a after the acquisition. In this manner, the terminal 31 can recognize that the signal is the wrong signal.

Therefore, in the case of the wrong signal, the terminal 31 can determine the first satellite-to-be-acquired again and obtain the first difference information from one of the SPS satellite 12b-12d.

Operation Example of the Terminal 31

The terminal 31 is constituted as described above. An operation example of the terminal 31 will be hereinafter explained.

FIGS. 11, 12, 13, and 14 are schematic flowcharts showing the operation example of the terminal 31.

Figure 11:
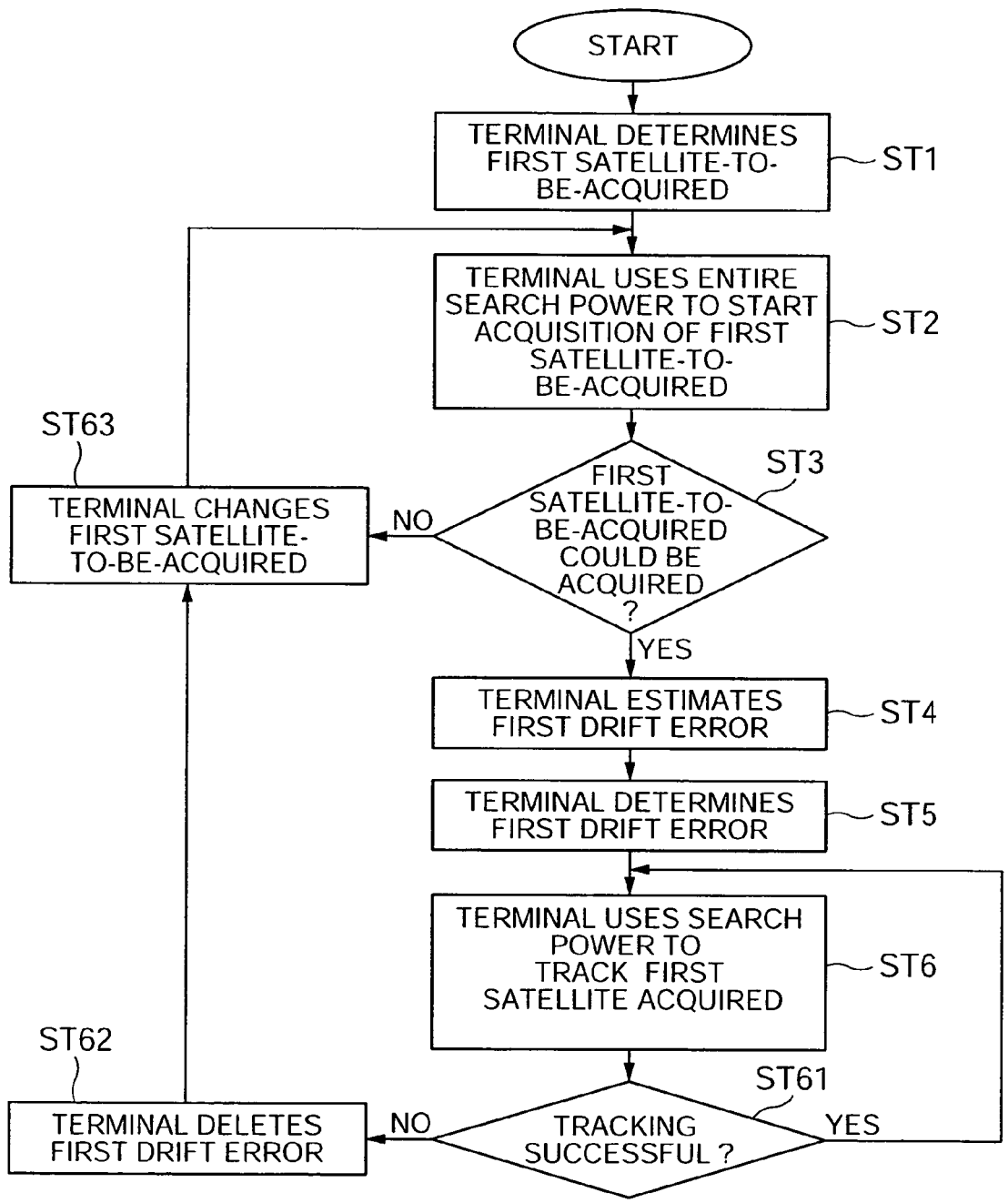
FIG. 11 is a flowchart showing the first satellite acquisition operation of the terminal in accordance with the second embodiment of the present invention.

As in the terminal 30 of the first embodiment, the terminal 31 determines a first drift error through steps ST1 to ST5 shown in FIG. 11. More specifically, the control unit 100 in FIG. 10 acquires, for example, the SPS 12a that in step ST1 is determined as the first satellite-to-be-acquired, using the entire search power (step ST2). If the acquisition is successful (step ST3), the control unit 100 estimates a first drift error (step ST4) to determine the first drift error indicated as the drift error D2 in FIG. 8 (step ST5). Then, as shown in FIG. 10, the control unit 100 stores the first drift error in the second storing unit 126 as the first drift information 134.

Subsequently, the terminal 31 tracks the SPS satellite 12a using the search power reserved for tracking (step ST6).

When the tracking fails (step ST61), the control unit 100 deletes the first drift error from the second storing unit 126 (step ST62) to change the first satellite-to-be-acquired (step ST63). In other words, if the first satellite-to-be-acquired cannot be tracked in step ST61, the terminal 31 executes the first satellite-to-be-acquired acquiring step (step STI) again.

Step ST6 is an example of the first satellite-to-be-acquired tracking step, in which the terminal 31 uses the searching means reserved for tracking one SPS satellite to track the first satellite-to-be-acquired.

Figure 12:
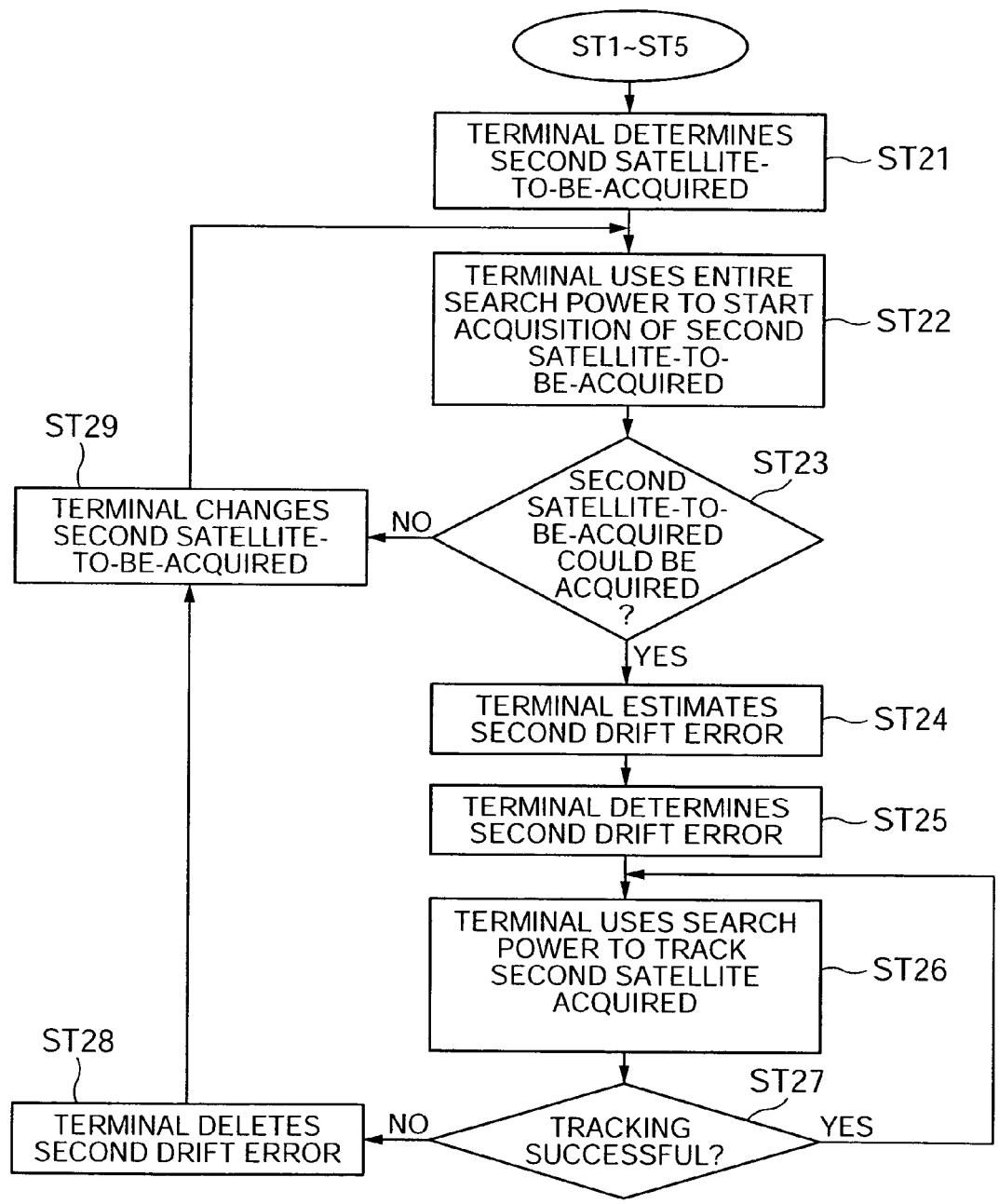
FIG. 12 is a flowchart showing the second satellite acquisition operation of the terminal in accordance with the second embodiment of the present invention, to be partially concurrently performed with the first satellite acquisition operation shown in FIG. 11.

When the terminal 31 determines the first drift error in step ST5 in FIG. 11, the terminal 31 executes step ST21 and the subsequent steps in FIG. 12 concurrently with step ST6 and the subsequent steps in FIG. 11.

In step ST21, the control unit 100 in FIG. 10 selects, for example, the SPS satellite 12b shown in FIG. 1 as a second satellite-to-be-acquired. The control unit 100 starts acquisition of the SPS satellite 12b using all the available search power (step ST22). Once the acquisition is completed (step ST23), the control unit 100 estimates a second drift error (step ST24) and determines the second drift error (step ST25). The control unit 100 stores the generated second drift error in the second storing unit 126 as the second drift information 136.

Step ST21 is an example of the second satellite-to-be-acquired determining step, in which the terminal 31 selects a second satellite-to-be-acquired from among the plurality of SPS satellites 12b-12d that remain after the first satellite-to-be-acquired acquiring step (step ST2). Note that the terminal 31 in this embodiment executes step ST21 after step ST5. However, unlike in this embodiment, step ST21 does not always have to be executed after step ST5, as long as step ST21 is executed after step ST2.

Step ST22 is an example of the second satellite-to-be-acquired acquiring step, in which the terminal 31 acquires the second satellite-to-be-acquired, for example the SPS satellite 12b, using all the available searching means. Here, the available searching means are the remaining search power excluding the search power reserved for the tracking of the first satellite-to-be-acquired, which is the SPS satellite 12a.

Step ST24 is an example of the second difference information obtaining step, in which the terminal 31 obtains second difference information indicating a difference between the initial search frequency H2b shown in FIG. 15, which is the terminal side synchronizing frequency, and the second acquisition frequency SH1b, which is the frequency at which the second satellite-to-be-acquired is acquired.

Subsequently, the terminal 31 tracks the SPS satellite 12b (step ST26). If the tracking is not successful (step ST27), the control unit 100 deletes the second drift information 136 stored in the storing unit 126 (step ST28), changes the second satellite-to-be-acquired (step ST29), and executes step ST22 again.

Figure 13:
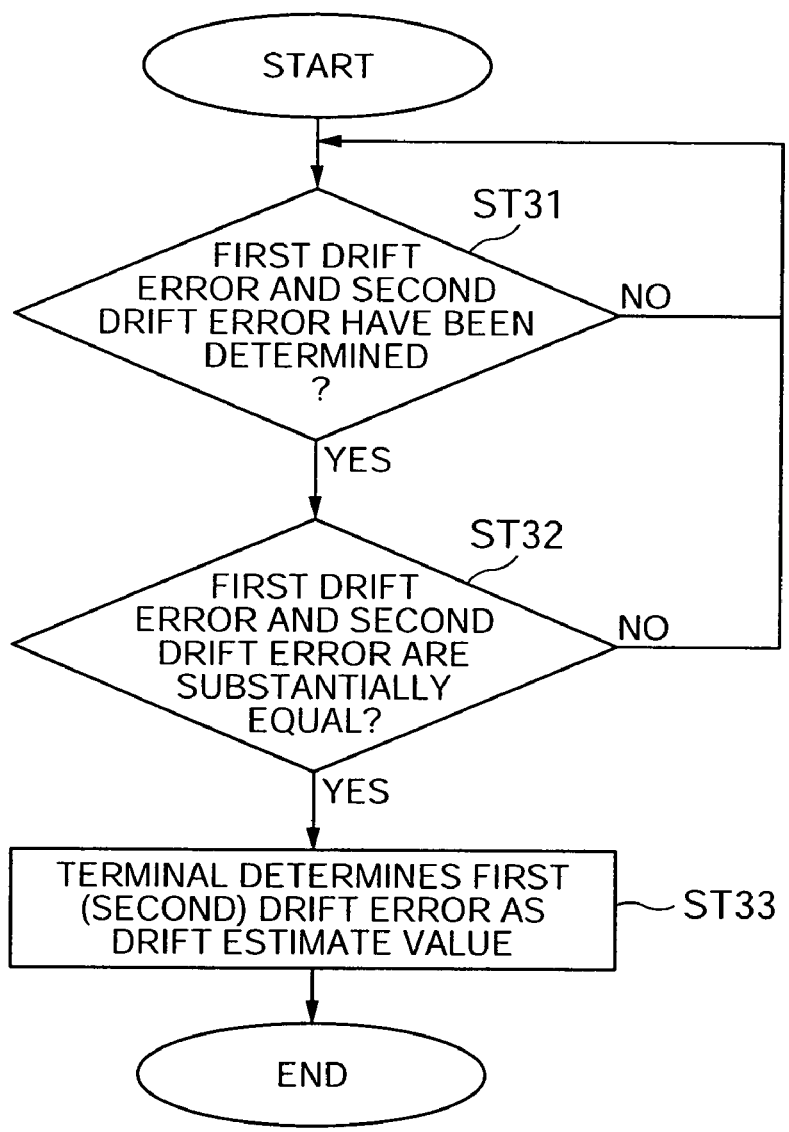
FIG. 13 is a flowchart showing the verification operation of the terminal in accordance with the second embodiment of the present invention, to be concurrently performed with the satellites acquisition operations shown in FIGS. 11 and 12.

Concurrently with the satellites acquisition operations shown in FIGS. 11 and 12, the control unit 100 executes the verification operation shown in FIG. 13. When the terminal 31 in step ST31 determines that the first drift error and the second drift error have been obtained in step ST5 shown in FIG. 11 and in step ST25 shown in FIG. 12 (step ST31 in FIG. 13), the terminal 31 in step ST32 determines whether the first drift error indicated by the first drift information 134 and the second drift error indicated by the second drift information 136 are substantially equal. If the first drift error and the second drift error are substantially equal, the terminal 31 designates the first drift error or the second drift error as a drift estimate value (step ST33). The control unit 100 stores the designated drift estimate value in the second storing unit 126 as the drift estimate value information 134. Otherwise, the control unit 100 returns to the step ST31 and wait for the next first and second drift errors to be determined.

Figure 14:
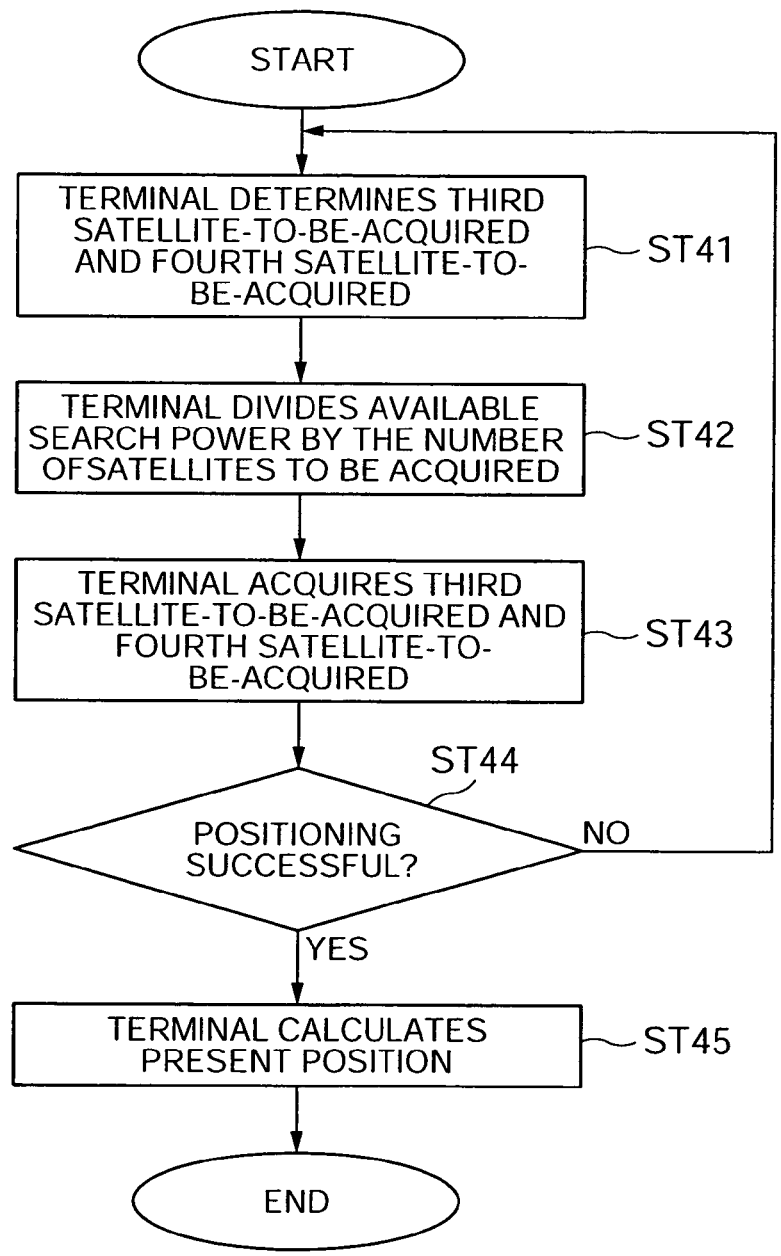
FIG. 14 is a flowchart showing the sufficient satellites acquisition operation of the terminal accordance with the second embodiment of the present invention, where a sufficient number of satellites are acquired.

Then, the control unit 100 uses this drift estimate value information 134 to execute step ST41 and the subsequent steps shown in FIG. 14.

In step ST41, the terminal 31 determines that, for three-dimensional positioning, for example, two more SPS satellites are required apart from the SPS satellite 21a and the SPS satellite 12b that have already been acquired. The terminal 31 determines, for example, the SPS satellite 12c as a third satellite-to-be-acquired, and the SPS satellite 12d as a fourth satellite-to-be-acquired.

Then, the terminal 31 divides the available search power by 2, which is the number of satellite-to-be-acquired (step ST42). Then, the terminal 31 acquires the SPS satellite 12c, which is the third satellite-to-be-acquired, and the SPS satellite 12d, which is the fourth satellite-to-be-acquired, by searching the SPS satellite 12c and the SPS satellite 12d (step ST43).

If the positioning is successful in step ST44, the terminal 31 calculates the present position in step ST45, and displays the present position on the display unit 104 shown in FIG. 10.

As described above, when the drift error indicated by the first difference information and the drift error indicated by the second difference information are substantially equal, the terminal 31 acquires the other SPS satellites 12c-12d that are required for positioning using the first difference information or the second difference information. In other words, by obtaining the second difference information, the terminal 31 can acquire the remaining SPS satellites 12c-12d that are required for positioning after verifying whether the first difference information is accurate. Thus, it is possible to acquire the SPS satellites 12c and the like promptly and perform positioning using either of the first difference information or the second difference information, which is verified to be accurate.

Note that, unlike in this embodiment, it is also possible that the terminal 31 can be configured to receive signals from more SPS satellites than it needs for the purpose of positioning, and select the SPS satellites that have least positioning errors from among the acquired SPS satellites to perform the positioning.

Program and Computer Readable Recording Medium

The program of the present invention is a control program for a terminal apparatus that causes a computer to execute the first satellite-to-be-acquired determining step, the first satellite-to-be-acquired acquiring step, the first difference information obtaining step, the second satellite-to-be-acquired determining step, the second satellite-to-be-acquired acquiring step, the second difference information obtaining step, and the step of acquiring sufficient satellites for positioning, as in the operation examples described above.

In addition, the computer readable recording medium of the invention is a computer readable recording medium having recorded therein such a control program for a terminal apparatus.

A program storage medium, which is used for installing such control program for a terminal apparatus in a computer and allows the control program to be executed, can be realized, for example, as flexible disks such as FLOPPY DISCS (registered trademark) and package media such as CD-ROMs (Compact Disc Read Only Memory), CD-Rs (Compact Disc-Recordable), CD-RWs (Compact Disc-Rewritable), and DVDs (Digital Versatile Disc) as well as semiconductor memories, magnetic disks, magneto-optical disks, and other storage media in which programs are stored temporarily or permanently.

The invention is not limited to the respective embodiments described above. The respective embodiments may be combined with each other.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

Unless otherwise defined in the description of the embodiments, the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-144875. The entire disclosure of Japanese Patent Application No. 2004-144875 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A terminal apparatus configured to receive position related information signals from a plurality of SPS satellites, the terminal apparatus comprising:

a control unit determining a first satellite-to-be-acquired from among the plurality of SPS satellites, and generating a first initial search frequency for the first satellite-to-be- acquired; and a positioning device having a plurality of search units, the positioning device acquiring the first satellite-to-be-acquired by using the plurality of search units, the control unit determining first drift information, the first drift information being a difference between the first initial search frequency and the frequency acquiring the first satellite-to-be-acquired, the control unit determining a second satellite-to-be-acquired from among the plurality of SPS satellites excluding the first satellite-to-be-acquired, the control unit generating a second initial search frequency for the second satellite- to-be-acquired, the positioning device acquiring the second satellite-to-be-acquired by using some of the plurality of search units, the control unit determining second drift information, the second drift information being difference between the second initial search frequency and the frequency acquiring the second satellite-to-be-acquired, the control unit verifying the first drift information by comparing the first and second drift information, when the first and second drift information is substantially equal, the control unit generating corrected search frequency by using one of the first and second drift information for at least some of the plurality of SPS satellites excluding the first and second satellites-to- be-acquired, the positioning device acquiring at least another position information satellite by using the corresponding corrected search frequency.

2. The terminal apparatus according to claim 1, wherein the positioning device sets aside some of the search units to track the first satellite-to- be-acquired that has been acquired, and the positioning device acquires the second satellite-to-be-acquired by using all of the remaining search units.

3. The terminal apparatus according to claim 1, wherein the positioning device sets aside some of the remaining search units to track the second satellite-to-be-acquired that has been acquired, the control unit determines how many SPS satellites need to be acquired, and the positioning device acquires all other SPS satellites that need to be acquired by using all of the remaining search units and allocating the remaining search units substantially equally among the SPS satellites that need to be acquired.

4. The terminal apparatus according to claim 1, wherein the positioning device sets aside some of the remaining search units to track the first satellite-to-be-acquired that has been acquired, and when the tracking of the first satellite-to-be-acquired fails, the control unit further determines a new first satellite-to-be-acquired.

5. The terminal apparatus according to claim 1, wherein the positioning device sets aside some of the remaining search units to track the first satellite-to-be-acquired that has been acquired, the control unit determines how many SPS satellites need to be acquired, and the positioning device acquires all other SPS satellites that need to be acquired by using all of the remaining search units and allocating the remaining search units substantially equally among the SPS satellites that need to be acquired.

6. The terminal apparatus according to claim 1, wherein the control unit has a first satellite-to-be-acquired capturing program, and the positioning device acquires the first satellite-to-be-acquired by using an entirety of the plurality of search units in accordance with the first satellite-to-be-acquired capturing program.

7. The terminal apparatus according to claim 6, wherein the positioning device further includes a crystal oscillator, and the search units allow the frequency generated by the oscillation of the crystal oscillator to be modulated such that a signal having a synchronizing frequency is used to capture satellites.

8. The terminal apparatus according to claim 6, wherein the terminal apparatus is a mobile telephone.

9. A terminal apparatus configured to receive position related information signals from a plurality of SPS satellites, the terminal apparatus comprising:

search means for searching SPS satellites with a predetermined search power;

synchronizing frequency information means for determining initial search frequencies of the terminal for each of the plurality of SPS satellites;

first satellite-to-be-acquired determining means for determining a first satellite-to-be- acquired from among the plurality of SPS satellites;

first satellite-to-be-acquired acquiring means for acquiring the first satellite-to-be- acquired by using the search means with the predetermined search power;

first drift information obtaining means for obtaining first drift information indicating a difference between the initial search frequency of the first satellite-to-be-acquired and a first acquisition frequency at which the first satellite-to-be-acquired is acquired;

second satellite-to-be-acquired determining means for determining a second satellite- to-be-acciuired from among the plurality of SPS satellites excluding the first satellite-to-be- acquired, second satellite-to-be-acquired acquiring means for acquiring the second satellite-to- be-acquired, second drift information obtaining means for obtaining second drift information indicating a difference between the initial search frequency of the second satellite-to-be-acquired and a second acquisition frequency at which the second satellite-to-be-acquired is acquired, the first drift information being verified by comparing the first and second drift information, and means for acquiring sufficient satellites acquiring a sufficient number of SPS satellites required for positioning the terminal apparatus by using at least one of the first drift information and the second drift information, when the first and second drift information are substantially equal, and positioning means for obtaining position related information from the SPS satellites that have been acquired, and locating a present position of the terminal apparatus.

10. The terminal apparatus according to claim 9, further comprising first satellite-to-be-acquired tracking means for tracking the acquired first satellite-to- be-acquired by using some of the search power, wherein the second satellite-to-be-acquired acquiring means acquires the second satellite-to- be-acquired by using all of the remaining search power.

11. The terminal apparatus according to claim 9, further comprising first satellite-to-be-acquired tracking means for tracking the acquired first satellite-to- be-acquired by using some of the search power, and second satellite-to-be-acquired tracking means for tracking the acquired second satellite-to-be-acquired by using some of the remaining search power, wherein the means for acquiring sufficient satellites acquires the sufficient number of SPS satellites with the still remaining search power.

12. The terminal apparatus according to claim 10, wherein when the first satellite-to-be-acquired tracking means fails to track the acquired first satellite-to-be-acquired, the first satellite-to-be-acquired determining means determines a first satellite-to-be-acquired again.

13. A positioning method for use in a terminal apparatus configured to receive position related information signals from a plurality of SPS satellites, the positioning method comprising:

determining a first satellite-to-be-acquired by the terminal apparatus from among the plurality of SPS satellites;

acquiring a first satellite-to-be-acquired by the terminal apparatus by using a first initial search frequency of the first satellite-to-be-acquired;

obtaining first drift information by the terminal apparatus, the first drift information indicating a difference between the first initial search frequency of the first satellite-to-be- acquired and a first acquisition frequency acquiring the first satellite-to-be-acquired;

determining a second satellite-to-be-acquired by the terminal apparatus from among the plurality of SPS satellites excluding the first satellite-to-be-acquired:

acquiring a second satellite-to-be-acquired by the terminal apparatus by using a second initial search frequency of the second satellite-to-be-acquired;

obtaining second drift information by the terminal apparatus indicating a difference between the second initial search frequency of the second satellite-to-be-acquired and a second acquisition frequency at which the second satellite-to-be-acquired is acquired;

acquiring the sufficient number of SPS satellites by the terminal apparatus by using at least one of the first drift information and second drift information to acquire the sufficient number of SPS satellites required for positioning the terminal apparatus, when the first and second drift information are substantially equal;

positioning via the terminal apparatus obtaining position related information from the acquired SPS satellites, and locating a present position of the terminal apparatus; and displaying the present position by the terminal apparatus.

14. The positioning method according to claim 13, wherein acquiring the sufficient number of SPS satellites includes the terminal apparatus comparing the first and second drift information and acquiring the sufficient number of SPS satellites by using one of the first and second drift information when the first and second drift information is substantially equal.

15. The positioning method according to claim 13, further comprising tracking the first satellite-to-be-acquired that is acquired by using some search power of the terminal apparatus, wherein the terminal executes acquiring the second satellite-to-be-acquired by using all the remaining search power.

16. The positioning method according to claim 13, further comprising tracking the first satellite-to-be-acquired that is acquired by using some search power of the terminal apparatus, and tracking the second satellite-to-be-acquired that is acquired includes by using some of the remaining search power of the terminal apparatus, wherein acquiring the sufficient number of SPS satellites includes allocating the remaining search power substantially equally among the number of SPS satellites to be acquired.

17. The positioning method according to claim 13, wherein tracking the first satellite-to-be-acquired includes when tracking of the first satellite- to-be-acquired fails, the terminal apparatus executes determining the first satellite-to-be- acquired again.

18. A control program for a terminal apparatus that causes a computer to execute the steps of the positioning method set forth in claim 14.

19. A computer readable recording medium having recorded therein the control program for a terminal apparatus as set forth in claim 18.

* * * * *